United States Patent

Tanaka et al.

[11] Patent Number: 5,859,143
[45] Date of Patent: Jan. 12, 1999

[54] PROCESS FOR CONTINUOUSLY PRODUCING PROPYLENE-BASED BLOCK COPOLYMER

[75] Inventors: Eiji Tanaka; Fumihiko Shimizu, both of Okayama, Japan

[73] Assignee: Mitsubishi Chemical Corporation, Japan

[21] Appl. No.: 843,653

[22] Filed: Apr. 16, 1997

[30] Foreign Application Priority Data

Apr. 18, 1996 [JP] Japan ........................ 8-96602
Oct. 14, 1996 [JP] Japan ....................... 8-270782
Oct. 14, 1996 [JP] Japan ....................... 8-270783

[51] Int. Cl.$^6$ .................... C08F 255/02; C08F 2/34; C08F 2/36
[52] U.S. Cl. .................... 525/247; 525/323; 526/65; 526/67; 526/68
[58] Field of Search .................... 525/323, 247; 526/65, 67, 68

[56] References Cited

U.S. PATENT DOCUMENTS 5,324,784 6/1994 Fujita et al. ........................ 525/247
5,473,021 12/1995 Koura et al. ....................... 525/247
5,618,886 4/1997 Shinozaki et al. .................. 525/270

FOREIGN PATENT DOCUMENTS 55-116716  9/1980  Japan.
7-286004  10/1995  Japan.

*Primary Examiner*—Jeffrey Mullis
*Attorney, Agent, or Firm*—Nixon & Vanderhye

[57] ABSTRACT

A process for continuously producing a propylene-based block copolymer having an excellent impact resistance of the present invention, comprises:

a first polymerization step comprising polymerizing α-olefin comprising propylene in the presence of hydrogen and a stereoregular polymerization catalyst comprising a solid catalyst component containing magnesium, titanium, halogen atom and an electron-donor compound, an organoaluminum compound and, if required, an electron-donar compound in a single polymerization reactor; and a second polymerization step comprising transporting α-olefin polymer obtained in the first polymerization step to a copolymerization reactor and copolymerizing propylene with α-olefin other than propylene in a gas phase substantially in the presence of said stereoregular polymerization catalyst used in the first polymerization step.

16 Claims, 4 Drawing Sheets

PROCESS FOR CONTINUOUSLY PRODUCING PROPYLENE-BASED BLOCK COPOLYMER

BACKGROUND OF THE INVENTION

The present invention relates to a process for continuously producing a propylene-based block copolymer having an excellent impact resistance.

As methods of improving an impact resistance of crystalline polypropylene, there are known (1) a method of copolymerizing propylene with α-olefin which co-exists therewith in a small amount upon the polymerization of propylene, (2) a method of mechanically blending a rubber component with polypropylene, (3) a method of polymerizing propylene as a primary component and then copolymerizing propylene with α-olefin other than propylene, that is, carrying out a so-called block copolymerization, or the like.

However, in the case of the above method (1), there arises a problem that although the impact resistance of the resulting copolymer is improved, the rigidity thereof is considerably lowered so that the balance between the rigidity and the impact resistance is deteriorated. Further, in the case of the above method (2), although the balance between the rigidity and the impact resistance is improved, this method is disadvantageous in production costs because the rubber component blended are usually expensive.

Under these circumstances, the above block copolymerization method (3) is used as the most effective method for improving an impact resistance of crystalline polypropylene. In this block copolymerization method, a rubber-like component which is constituted by blocks composed of a copolymer of propylene and ethylene or the like, is produced in the presence of a resinous component constituted by blocks composed primarily of propylene. Both the components are blended with each other by being continuously subjected to the polymerization. The block polymerization method, which is referred to as "chemical blend", is favorably used.

Meanwhile, in order to reduce the production costs, the block copolymerization is carried out more advantageously by a continuous process in which the respective blocks are produced in separate polymerization reactors (if required, each block can be produced in two or more different polymerization reactors), than a batch process.

However, in the case of the process using an excessively large number of polymerization reactors, there arise disadvantages such as increase in installation costs or running costs. Therefore, it is desirable to conduct each block in a single polymerization reactor. In the case of the production of the block copolymer composed of two different blocks A and B, it is most desirable to produce the block copolymer in a continuous process using two reactors. In such a case, as conventionally known, a first reactor is used to prepare the resinous component composed primarily of propylene and a second reactor is used to prepare the rubber-like component.

Incidentally, there is a tendency that propylene-based block copolymer obtained by a simple continuous process using two reactors is deteriorated in impact resistance as compared with the block copolymer obtained by a batch process. It is suggested that the difference in impact resistance therebetween is caused due to the following mechanism.

That is, in each reactor used in the continuous process, there is a difference in residence time between respective reaction materials, i.e., a distribution of residence time thereof exist. For this reason, in the simple continuous process using two reactors, considerably large amount of polymer particles and catalyst particles are transferred from the first reactor to the second reactor before these materials remain in the first reactor for a necessary residence time (such a phenomenon is called "short pass"). The particulate mixture of polymer and catalyst particles short-passed through the first reactor cannot contain a sufficient amount of resinous component due to a short residence time in the first reactor and in addition exhibits a higher polymerization activity than those remaining in the first reactor for the defined residence time. The short-passed polymer particles turn into polymer particles having a higher rubber content than required in the second reaction. A rubber-like component contained in such a high rubber content polymer particles causes deteriorated dispersion when subjected to melt-mixing, resulting in forming so-called fish eyes in shaped products. The fish eyes thus formed are apt to cause centers of breakage of the molded product because excessive stress is concentrated at boundary surface portions thereof. Accordingly, it is considered that the resultant block copolymer unsuitably suffers from deterioration in impact resistance, especially low-temperature impact resistance.

In view of the afore-mentioned mechanism, in order to prevent the deterioration in impact resistance, it is effective to suppress the occurrence of such "short pass" of the polymer and catalyst particles. In order to attain this object, for example, Japanese Patent Publication (Kokoku) No. 49-12589 (1974) has proposed a process of using, in the afore-mentioned first polymerization stage, a plurality of polymerization reactors which are connected in series with each other. However, such a process is a multiple reactors process and, therefore, become disadvantageous in costs as described above.

Further, since an alternative method of suppressing the "short pass" of the particles in the first reactor, there is known a process of using a classification system. For example, Japanese Patent Applications Laid-open (Kokai) Nos. 51-135987 (1976) and 55-116716 (1980) disclose a process of subjecting the polypropylene particles in the first reactor to concentration and classification processes, thereby removing therefrom the catalyst particles short-passed through the first reactor or polypropylene particles having a small particle size due to insufficient growth. Furthermore, Japanese Patent Application Laid-open (Kokai) No. 55-106533 (1980) discloses a process in which a polymer slurry is discharged while stirring from the first reactor, then subjected to counter-flow washing, thereby producing a slurry containing substantially few amount of polypropylene particles having a small particle size, and then supply such a slurry to the second copolymerization reactor. However, in such a simple classification system, the impact resistance of the final product cannot be sufficiently improved.

In addition, Japanese Patent Application Laid-open (Kokai) No. 7-286004 (1995) discloses a method of continuously producing an olefin polymer by a classification system using a cyclone. However, such a method has the following problem. First, in the method, particles having a small particle size, especially fine particles having a diameter of less than 75 µm, cannot be separated sufficiently, resulting in insufficient effects of suppressing the "short pass" of the polymer and catalyst particles in the first reactor. Second, in the case of the classification system using a cyclone, when the recycling percentage of the particles is increased to enhance its classification efficiency, there arise a problem that the productivity is considerably deteriorated.

On the other hand, apart from the afore-mentioned viewpoint of suppressing the "short pass", there is also known a method for improving the impact resistance of propylene-based block copolymer by supplying some kinds of assistants to the reaction system in a rubber polymerization stage. For example, Japanese Patent Application Laid-open (Kokai) No. 55-115417 (1980) discloses a method of supplying tertiary amine, ketone, ether, ester, acid amide or phosphoric acid amide; Japanese Patent Application Laid-open (Kokai) No. 57-147508 (1982) discloses a method of supplying a halogen-containing aluminum compound; Japanese Patent Application Laid-open (Kokai) No. 61-69821 (1980) discloses a method of supplying alcohol; Japanese Patent Application Laid-open (Kokai) No. 62-116618 (1987) discloses a method of supplying glycol ether; and Japanese Patent Application Laid-open (Kokai) No. 1-152116 (1989) discloses a method of supplying hydrogen sulfide.

However, when a magnesium compound supported highly active catalyst is used, the addition of such assistants cannot improve the impact resistance to a satisfactory extent. Specifically, when it is intended to improve the impact resistance, it is necessary to considerably reduce a polymerization activity of the rubber-like component. For this reason, there is caused a large gap between the polymerization activity to the rubber-like component in the second reactor and the activity of the propylene polymer in the first reactor, resulting in deteriorated productivity.

Thus, the afore-mentioned conventional techniques still exhibit various problems with respect to costs and properties of the products.

As a result of various studies by the present inventors, it has been found that by using a magnesium compound supported highly active catalyst which has a sharp particle size distribution, the short pass of the catalyst in the first polymerization stage is effectively suppressed, a propylene-based block copolymer having a good impact resistance can be produced with low costs. The present invention has been attained on the basis of this finding.

SUMMARY OF THE INVENTION

It is an object of the present invention to provide a process for continuously producing propylene-based block copolymer having an excellent impact resistance.

To accomplish the aim, in a first aspect of the present invention, there is provided a process for continuously producing a propylene-based block copolymer, which process comprises a first polymerization step of polymerizing α-olefin comprising propylene in the presence of hydrogen and a stereoregular polymerization catalyst comprising a solid catalyst component containing magnesium, titanium, halogen atom and an electron-donor compound, an organoaluminum compound and, if required, an electron-donar compound in a single polymerization reactor, and a second polymerization step of transporting α-olefin polymer obtained in the first polymerization step to a copolymerization reactor and copolymerizing propylene with α-olefin other than propylene substantially in a gas phase under the influence of the said stereoregular polymerization catalyst used in the first polymerization step, (1) an index "n" (n represents the sharpness of a particle size distribution of the solid catalyst component) being not less than 5 (n≧5) when the particle size distribution thereof is approximated (applied) to Rosin-Rammler distribution, and (2) an average CE (CE represents a catalytic efficiency defined as an amount of polymer produced per unit weight of the solid catalyst component) of polymer discharged from the first polymerization step and supplied to the second polymerization step being not less than 1.1 times an average CE of the polymer existing in the first polymerization step.

In a second aspect of the present invention, there is provided a process for continuously producing a propylene-based block copolymer, which process comprises a first polymerization step of polymerizing α-olefin comprising propylene in the presence of hydrogen and a stereoregular polymerization catalyst comprising a solid catalyst component containing magnesium, titanium, halogen atom and an electron-donar compound, an organoaluminum compound and, if required, an electron-donar compound in a single polymerization reactor, and a second polymerization step of transporting α-olefin polymer obtained in the first polymerization step to a copolymerization reactor and copolymerizing propylene comprising polypropylene with α-olefin other than propylene substantially in a gas phase under the influence of the said stereoregular polymerization catalyst used in the first polymerization step, (1) an index "n" (n represents the sharpness of a particle size distribution of the solid catalyst component) being not less than 5 (n≧5) when the particle size distribution thereof is approximated (applied) to Rosin-Rammler distribution, and (2) a slurry of the polymer discharged from a polymerization reactor used in the first polymerization step being classified into a first slurry containing a large amount of large particles (for example, a slurry containing 1.0 to 80 wt % of large size particles having a particle size of not less than classification point depending on classification conditions) and a second slurry containing a large amount of small particles (for example, a slurry containing less than 1.0 wt % of small size particles having a particle size of less than classification point depending on classification conditions) by a classification system using a precipitation liquid-power classifier, the first slurry being transported to the second polymerization step and the second slurry being circulated to the first polymerization step.

In the process according to the present invention, the propylene-based block copolymer having an excellent impact resistance can be continuously produced with low cost and in a stable manner. Accordingly, the present invention can exhibit large industrial values.

The present invention can be achieved by using a magnesium compound supported catalyst having a sharp particle size distribution to suppress the short pass of the catalyst in the polymerization process. Especially, in accordance with the present invention, there can be obtained a propylene-based block copolymer having a good impact resistance. Specifically, in accordance with the present invention, there can be obtained a propylene-based block copolymer having a good impact resistance by satisfying the afore-mentioned two requirements simultaneously. From the knowledge accumulated in the course of the attainment of the present invention, the reason why the impact resistance of the propylene-based block copolymer is improved by satisfying the afore-mentioned requirements is presently suggested as follows.

That is, in order to suppress the short pass, it is required by any measure to separate catalyst particles in which a polymer is formed on the surface of a catalyst particle, having a short residence time in the first polymerization step from reaction mixture. In this case, the most practical separation method is one in which these catalyst particles are separated depending upon their particle sizes. This is because it is general that the particle size of the polymer particles produced by forming the polymer on the surface of the catalyst particle having a short residence time is small, while the polymer particles in which a polymer is formed on the surface of a catalyst particle, having a long residence time have a large particle size. Since, by prolonging the residence time, polymer particles having a large particle size are produced, the separation of the small particles results in the separation of the particles having a short residence time.

However, small size polymer particles do not necessarily identical to those having a short residence time, because the solid catalyst component used for the polymerization is generally a certain particle size distribution. Accordingly, in order to ensure the separation of the polymer particles having a short residence time, the solid catalyst component is required to have a sharp particle size distribution.

BRIEF DESCRIPTION OF THE DRAWINGS

FIGS. 1(a) and 1(b) are explanatory views of Rosin-Rammler distribution, in which FIG. 1(a) shows a correlation between cumulative weight fraction and diameter of polypropylene powder, and FIG. 1(b) shows a particle size distribution of polypropylene powder;

DETAILED DESCRIPTION OF THE INVENTION

Figure 1A:
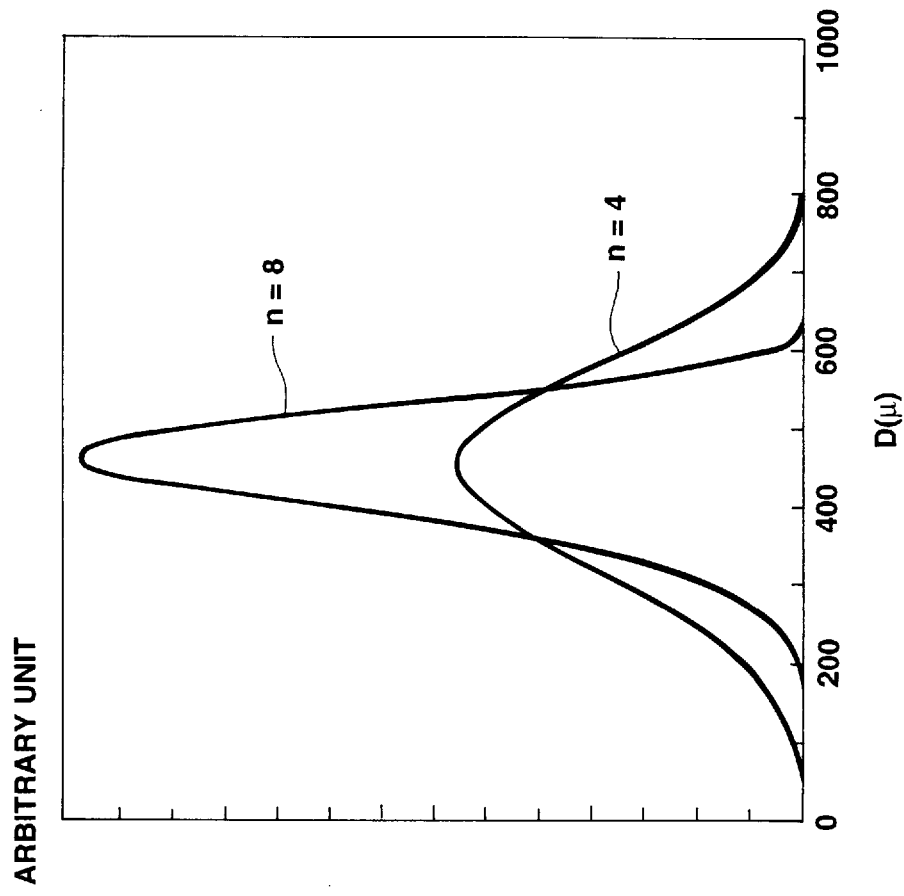

The process for the production of the propylene-based block copolymer according to the present invention comprises basically a step of producing an α-olefin polymer composed primarily of propylene (first polymerization stage), and a step of copolymerizing propylene with α-olefin other than propylene (second polymerization stage). Further, in accordance with the present invention, it is required that the first requirement (1) concerning the particle size distribution of the solid catalyst component and the second requirement (2) concerning the average CE of the polymer supplied to the second polymerization stage are satisfied at the same time.

Specifically, the afore-mentioned requirement (1) means that the solid catalyst component has a sharp particle size distribution, that is, the solid catalyst component contains no particles having excessively small particle size or excessively large particle size, based on a reference particle size especially no fine particles.

Also, the afore-mentioned requirement (2) concerning the average CE, means that the polymer of a short residence time in the first polymerization stage is suppressed from being supplied to the second polymerization stage. The term "CE" means a catalytic efficiency and is defined as weight of the polymer produced per unit weight of the solid catalyst component. Usually, in a continuous polymerization process, there is established a certain correlation between the residence time and the CE value of the polymer in the polymerization process. In general, the longer residence time of the polymer, the larger CE value. On the contrary, the shorter residence time of the polymer, the smaller CE value. In the process according to the present invention, the average CE value of the polymer supplied to the second polymerization stage is not less than 1.1 times that of the polymer in the first polymerization stage, so that the polymer of a short residence time in the first polymerization stage can be suppressed from being supplied to the second polymerization stage.

The most practical method used for the separation and classification of the polymer particles based on the average CE values is a method in which the polymer particles produced are separated depending upon their particle sizes. This method has been attained in view of the tendency that the larger average CE value of the polymer, the larger particle size. Also, the particle size of the polymer produced is likely to be influenced by that of the solid catalyst component. However, since the particle size distribution of the solid catalyst component is limited to a prescribed range according to the requirement (1), the correlation between the particle size and CE value of the polymer produced in the first polymerization stage, and the correlation between CE value and the residence time thereof is maintained sufficiently.

It is essential to the process according to the present invention that the average CE of the polymer discharged from the first polymerization stage and supplied to the second polymerization stage is not less than 1.1 times the average CE of the polymer existing in the first polymerization stage (requirement (2)). The ratio in average CE between the polymer existing in the first polymerization stage and the polymer discharged from the first polymerization stage and supplied to the second polymerization stage, is an index of suppressing the short pass. The larger ratio in average CE, the higher effects of suppressing the short pass. Accordingly, it is preferred that the ratio in average CE is as large as possible. However, when respective average CE values are practically usable and the ratio therebetween is too large, the polymer is retained in the first polymerization stage for excessively long period of time, so that an activity of the catalyst is deteriorated to a great extent, thereby lowering of the catalytic activity in the second polymerization stage. Accordingly, the ratio in the average CE of the polymer discharged from the first polymerization step and supplied to the second polymerization step to the polymer existing in the first polymerization step is preferably 1.1 to 5.0 times, more preferably 1.2 to 3.0 times.

In accordance with the present invention, as a means (classification system) for achieving such a requirement (2), there can be suitably used any optional methods. Examples of these suitable methods may include a method (i) of removing only the polymer of which average CE is not less than 1.1 times that of the polymer existing in the first polymerization stage, from the polymerization reactor used therein and then supplying the polymer to another polymerization reactor used for the second polymerization stage, and a method (ii) of removing the polymer from the polymerization reactor used for the first polymerization stage, separating the polymer of which average CE is not less than 1.1 times that of the polymer existing in the first polymerization stage, from the discharged polymer on the outside of the polymerization reactor and supplying the separated polymer to the polymerization reactor used for the second polymerization stage.

As a typical one of the said methods (i), there is a dry separation method adopting a gas-phase polymerization using a fluidized bed in the first polymerization stage. In this method, a polymer is discharged from a region of the fluidized bed where the CE is expected to be high, thereby obtaining the polymer of which average CE is not less than 1.1 times the average CE of the polymer existing in the first polymerization stage.

In addition, as a typical one of the said methods (ii), there is a liquid-phase polymerization method in which inert hydrocarbons or olefin itself are used as a reaction medium, for example, a cyclone classification system or a system using a liquid-power classifier are exemplified. These classification methods are regarded as methods for classifying polymer particles depending upon difference in particle size and weight thereof which in turn is caused due to the difference in kind of the polymer produced and its CE. In accordance with the present invention, the method using a liquid-power classifier is especially suitable.

Such liquid-power classifier means an apparatus for classifying the polymer particles by contacting a slurry discharged from the first polymerization stage with a classifying medium (preferably, a supernatant produced by a hydrocylone described later) in a counter flow manner therein.

1) First polymerization stage:

In the first polymerization stage, α-olefin containing propylene as a main component is polymerized. That is, propylene is homopolymerized or propylene is copolymerized with a small amount of α-olefin other than propylene (including ethylene). In the case of the copolymerization, the α-olefins other than propylene may be those having 2 to 18 carbon atoms, preferably 2 to 8 carbon atoms. Concretely, as the α-olefin other than propylene, ethylene, 1-butene, 1-pentene, 1-hexene, 1-octene or the like may be exemplified. In general, when the amount of the α-olefin copolymerized with propylene is increased, the resultant block copolymer is improved in transparency, whitening resistance or the like. However, when the amount of the α-olefin used is too large, the rigidity or heat-resistance of a molded product formed from such a block copolymer is considerably deteriorated. For these reasons, the amount of the α-olefin copolymerized with propylene in the first polymerization stage is generally not more than 5% by weight, preferably not more than 3% by weight.

The polymerization or copolymerization in the first polymerization stage can be carried out by continuously supplying the stereoregular polymerization catalyst or respective components capable of constituting the stereoregular polymerization catalyst (e.g., those including the solid catalyst component, a co-catalyst and optionally an electron-donar compound or contacted materials thereof), a propylene monomer, optionally the α-olefin other than propylene, and hydrogen to the polymerization reactor. The polymerization conditions or the like in the first polymerization stage are described later.

① Stereoregular polymerization catalyst:

The stereoregular polymerization catalyst used in the present invention comprises, as main components, the solid catalyst component, an organoaluminum compound and, if required, the electron-donor compound. In addition, the stereoregular polymerization catalyst may contain various other components than the afore-mentioned main components.

The stereoregular polymerization catalyst usable in the present invention is essentially identical to conventional stereoregular polymerization catalysts, except that the solid catalyst component is required to satisfy the prescribed requirement (that is, the afore-mentioned requirement (1)) concerning its particle size distribution. Such a stereoregular polymerization catalysts composed of the solid catalyst component, the organoaluminum compound and, if required, the electron-donar compound are known in the art (for example, refer to Japanese Patent Applications Laid-open (Kokai) Nos. 56-811 (1981), 56-83006 (1981), 4-218507 (1992), 6-25338 (1994), 57-63311 (1982), 61-213208 (1986), 62-187706 (1987), 5-331233 (1993), 5-331234 (1993), 63-289004 (1988), 1-319508 (1989), 52-98706 (1977), 1-54007 (1989) and 3-72503 (1991)). In the present invention, among these stereoregular polymerization catalysts, those satisfying the afore-mentioned requirement (1) or those treated so as to satisfy the requirement (1) can be selectively used.

The details of the requirement (1) and the solid catalyst components (A) satisfying the requirement (1) are described below.

(A) Solid catalyst component:

The solid catalyst component used in the process according to the present invention may contain magnesium, titanium, halogen atom, and an electron-donor compound.

The magnesium contained in the solid catalyst component may be in the form of magnesium compounds including magnesium halides such as magnesium chloride, magnesium bromide, magnesium iodide or magnesium fluoride; alkoxy magnesium halide such as methoxy magnesium chloride, ethoxy magnesium chloride, iso-propoxy magnesium chloride, butoxy magnesium chloride, hexoxy magnesium chloride or octoxy magnesium chloride; aryloxy magnesium halides such as phenoxy magnesium chloride or methylphenoxy magnesium chloride, magnesium alkoxides such as methoxy magnesium, ethoxy magnesium, iso-propoxy magnesium, butoxy magnesium, n-octoxy magnesium or 2-ethylhexoxy magnesium; aryloxy magnesium such as phenoxy magnesium or dimethyl-phenoxy magnesium; magnesium carboxylates such as magnesium laurate or magnesium stearate; or the like. These magnesium compounds may be used singly or in the form a mixture of two or more thereof.

The titanium contained in the solid catalyst component may be generally tetra-valent titanium compounds represented by the formula: $Ti(OR)_g X_{4-g}$, wherein R is a hydrocarbon group; X is a halogen atom; and $0 \leq g \leq 4$. Specific examples of these titanium compounds may include titanium tetrahalides such as $TiCl_4$, $TiBr_4$ or $TiI_4$; alkoxy titanium trihalides such as $Ti(OCH_3)Cl_3$, $Ti(OC_2H_5)Cl_3$, $Ti(O-n-C_4H_9)Cl_3$, $Ti(O-i-C_4H_9)Cl_3$, $Ti(OCH_3)Br_3$, $Ti(OC_2H_5)Br_3$ or $Ti(O-i-C_4H_9)Br_3$; dialkoxy titanium dihalides such as $Ti(OCH_3)_2Cl_2$, $Ti(OC_2H_5)_2Cl_2$, $Ti(O-n-C_4H_9)_2Cl_2$, $Ti(O-i-C_4H_9)_2Cl_2$, $Ti(OCH_3)_2Br_2$, $Ti(OC_2H_5)_2Br_2$, $Ti(O-n-C_4H_9)_2Br_2$ or $Ti(O-i-C_4H_9)_2Br_2$; trialkoxy titanium monohalides such as $Ti(OCH_3)_3Cl$, $Ti(OC_2H_5)_3Cl$, $Ti(O-n-C_4H_9)_3Cl$, $Ti(O-i-C_4H_9)_3Cl$, $Ti(OCH_3)_3Br$, $Ti(OC_2H_5)_3Br$, $Ti(O-n-C_4H_9)_3Br$ or $Ti(O-i-C_4H_9)_3Br$; titanium tetra-alkoxides such as $Ti(OCH_3)_4$, $Ti(OC_2H_5)_4$, $Ti(O-n-C_4H_9)_4$ or $Ti(O-i-C_4H_9)_4$; a mixture thereof; or a mixture of any of these titanium compounds with a metal compound such as an aluminum compound, silicon compound or a sulfur compound, a hydrogen halide, a halogen atom or the like. The halogen contained in the solid catalyst component may be the afore-mentioned halogenated tetra-valent titanium compounds represented by the formula: $Ti(OR)_g X_{4-g}$, wherein R is a hydrocarbon group; X is a halogen atom; and $0 \leq g \leq 4$, hydrogen halides, halogen atoms, or the like.

As the electron-donar compounds contained in the solid catalyst component, there can be used any compounds conventionally known for the production of the solid catalyst component. In general, oxygen-containing compounds and/or nitrogen-containing compounds are suitably used. Examples of the oxygen-containing compounds may include generally ethers, ketones, esters, alkoxysilanes or the like. Examples of the nitrogen-containing compounds may include generally amines, amides, nitroso compounds, or the like.

(B) Organoaluminum compound:

As the organoaluminum compounds used as a co-catalyst for the stereoregular polymerization catalyst, there can be used any optional compounds suited to the aimed applications. Specifically, the organoaluminum compounds may include (i) trialkyl aluminum in which each alkyl group has, for example, 1 to 12 carbon atoms, e.g., trimethyl aluminum, triethyl aluminum, tri-n-propyl aluminum, tri-iso-butyl aluminum, trihexyl aluminum, trioctyl aluminum, tridecyl aluminum or tridodecyl aluminum; (ii) halogen-containing organoaluminum compounds, specifically the afore-mentioned trialkylaluminum in which one or two alkyl groups is substituted with, for example, chlorine, bromine or the like, e.g., diethyl aluminum chloride or sesqui-aluminum chloride; (iii) hydride-containing organoaluminum compounds, specifically the afore-mentioned trialkyl aluminum in which one or two alkyl groups is substituted with hydrogen, e.g., diethyl aluminum hydride, (iv) alkoxide-containing organoaluminum compounds, specifically the afore-mentioned trialkylaluminum in which one or two alkyl groups is substituted with alkoxy groups including an aryloxy group, especially those having about 1 to about 8 carbon atoms, e.g., dimethyl aluminum methoxide, diethyl aluminum methoxide or diethyl aluminum phenoxide; (v) aluminoxane (alumoxane), specifically alkyl aluminoxane in which each alkyl group has 1 to 12 carbon atoms, e.g., methyl aluminoxane, ethyl aluminoxane, iso-butyl aluminoxane or the like. These organoaluminum compounds may be used in the form of a mixture of two or more different compounds selected from the same group or different groups (i) to (v).

The amount of the organoaluminum compound used is not particularly restricted, but is generally such that the molar ratio of aluminum in the organoaluminum compound to titanium in the solid catalyst component is usually 0.1 to 10000, preferably 10 to 5000, more preferably 50 to 2000.

(C) Electron-donar compound:

As the electron-donor compounds which are optionally added to the stereoregular polymerization catalyst, there can be used those generally used as an optional component for the stereoregular polymerization catalysts. Examples of the suitable electron-donor compounds may include oxygen-containing compounds and/or nitrogen-containing compounds.

More specifically, the nitrogen-containing compounds may include amines or derivatives thereof such as triethyl amine, ethylene diamine, di-iso-propyl amine, di-t-butyl amine, pyridine, piperidine or 2,2,6,6-tetramethyl piperidine, and nitroso compounds such as N-oxides of tertiary amines, pyridines or quinolines.

The oxygen-containing compounds may include generally ethers, ketones, esters, alkoxy- or aryloxy-silanes or the like.

(i) The ethers suitable as the oxygen-containing compound may be those compounds in which hydrocarbon groups bonded to the etheric oxygen have, as a total number, usually about 2 to about 18 carbon atoms, preferably about 4 to about 12 carbon atoms, and may include, for example, diethyl ether, dipropyl ether, diethylene glycol-dimethyl ether, propylene glycol-dimethyl ether, ethylene oxide, tetrahydrofuran, 2,2,5,5-tetramethyl tetrahydrofuran, dioxane or the like.

(ii) The ketones suitable as the oxygen-containing compound may be those compounds in which hydrocarbon groups bonded to the ketonic carbonyl group have, as a total number, usually about 2 to about 18 carbon atoms, preferably about 4 to about 12 carbon atoms, and may include, for example, acetone, diethyl ketone, methyl ethyl ketone, acetophenone or the like.

(iii) The esters may be those compounds of which carboxylic acid moiety is in the form of an aryl-substituted carboxylic acid or an aralkyl-substituted carboxylic acid (the aryl group or the aryl moiety of the aralkyl group is preferably phenyl or lower (about $C_1$–$C_4$) alkyl-substituted and/or lower (about $C_1$–$C_4$) alkoxy-substituted phenyl, the alkyl moiety of the aralkyl group has about 1 to about 6 carbon atoms, and the remaining carboxyl group has about 1 to about 3 carbon atoms), or in the form of an aliphatic carboxylic acid (the aliphatic hydrocarbon group except for the carboxyl group having about 1 to about 3 carbon atoms has about 1 to about 20 carbon atoms, preferably about 2 to about 12 carbon atoms and may contain an etheric oxygen), and of which alcohol moiety has about 1 to about 8 carbon atoms, preferably about 1 to about 4 carbon atoms. The esters may be intramolecular esters of hydroxy-substituted derivatives corresponding to the afore-mentioned carboxylic acids. Examples of the esters may include phenyl ethyl acetate, methyl benzoate, ethyl benzoate, phenyl benzoate, methyl toluate, ethyl toluate, methyl anisate, ethyl anisate, methoxy methyl benzoate, methoxy ethyl benzoate, dimethyl phthalate, diethyl phthalate, dipropyl phthalate, dibutyl phthalate, di-iso-butyl phthalate, dihexyl phthalate, methyl methacrylate, ethyl methacrylate, γ-butyrolactone, ethyl cellosolve, or the like.

(iv) The alkoxy- or aryloxy-silanes suitably used as the oxygen-containing compound may be those compounds which have at least one alkoxy or aryloxy group bonded to a silicon atom and having about 1 to about 18 carbon atoms, preferably about 1 to about 4 carbon atoms, and of which silicon atom is bonded, at the other binding sites thereof, to an alkyl group, an aryl group or an aralkyl group. Incidentally, the said alkyl group, the said aryl group or the said aralkyl group bonded to the silicon atom has the same meaning as described above. Specifically, the alkoxy- or aryloxy-silanes may include, for example, tetramethoxysilane, ethyl-trimethoxysilane, n-propyl-trimethoxysilane, iso-propyl-trimethoxysilane, t-butyl-trimethoxysilane, phenyl-trimethoxysilane, cyclohexyl-trimethoxysilane, 1-methyl-cyclohexyl-trimethoxysilane, 1,1,2,2-tetramethyl-propyl-trimethoxysilane, diethyl-dimethoxysilane, di-n-propyl-dimethoxysilane, di-iso-propyl-dimethoxysilane, diphenyl-dimethoxysilane, t-butyl-methyl-dimethoxysilane, t-butyl-ethyl-dimethoxysilane, t-butyl-n-propyl-dimethoxysilane, t-butyl-iso-propyl-dimethoxysilane, cyclohexyl-methyl-dimethoxysilane, dicyclohexyl-dimethoxysilane, 1-methyl-cyclohexyl-methyl-dimethoxysilane, 1,1,2,2-tetramethyl-propylmethyl-dimethoxysilane, ethyl-triethoxysilane, n-propyl-triethoxysilane, iso-propyl-triethoxysilane, t-butyl-triethoxysilane, phenyl-triethoxysilane, cyclohexyl-triethoxysilane, 1-methyl-cyclohexyl-triethoxysilane, 1,1,2, 2-tetramethyl-propyl-triethoxysilane, diethyl-diethoxysilane, di-n-propyl-diethoxysilane, di-iso-propyl-diethyoxysilane, diphenyl-diethoxysilane, t-butyl-methyl-diethoxysilane, t-butyl-ethyl-diethoxysilane, t-butyl-n-propyl-diethoxysilane, cyclohexyl-methyl-diethoxysilane, cyclohexyl-ethyl-diethoxysilane, 1-methyl-cyclohexyl-methyl-diethoxysilane, 1,1,2,2-tetramethyl-propylmethyl-diethoxysilane, or the like.

Among these electron-donor compounds, piperidine or alkoxy- or aryloxy-silanes are preferably used. Especially preferred electron-donor compounds are alkoxy- or aryloxy-silanes.

The amount of the electron-donor compound used is not particularly restricted. However, the electron-donor compound may be generally used in such an amount that the molar ratio of the electron-donor compound to aluminum in the organoaluminum compound used as the co-catalyst is usually 0 to 10, preferably 0 to 2. Further, these electron-donor compounds can be used in the form of a mixture of any two or more compounds selected from the aforementioned same group or different groups.

(D) Preparation of stereoregular polymerization catalyst:

The stereoregular polymerization catalyst according to the present invention can be prepared by contacting respective catalyst components such as the solid catalyst component, the organoaluminum compound and optionally the electron-donar compound with each other inside or outside of the polymerization reactor in the presence or absence of the monomer to be polymerized.

The respective catalyst components can be supplied to the polymerization reactor individually or after any two or more components are preliminary contacted with each other. In this case, the respective catalyst components can be contacted with each other in an optional manner. That is, all the components can be contacted at the same time or they may be contacted one by one in a sequential manner. The method of supplying the catalyst components to the polymerization reactor is not particularly restricted. For example, the catalyst components can be supplied in the form of a solution or a suspension prepared by using an inert hydrocarbon solvent such as propane, butane, pentane, hexane, heptane, octane, nonane, decane, toluene or xylene, or otherwise directly supplied without the use of inert hydrocarbon solvent.

② Polymerization:

As the polymerization method for the first polymerization stage of the process according to the present invention, there can be used optional known methods. Examples of these methods may include a method of conducting a liquid-phase polymerization in the presence of inert hydrocarbon solvent, a polymerizing method of using liquefied olefin itself as a reaction medium, a method of conducting a gasphase polymerization substantially in the absence of liquid phase, or the like. Among these polymerization methods, the polymerization method using liquefied olefin itself as a reaction medium and the method of conducting a gas phase polymerization can be preferably used. Especially preferred polymerization method is the method using a liquefied olefin itself as a reaction medium, more preferably such a polymerization method of using liquid propylene as a reaction medium.

The polymerization method of using an olefin itself as a reaction medium is advantageous in production cost, because the method enables a high catalytic efficiency to be achieved for a short period of time in the first polymerization stage. Further, it is advantageous in that it is possible to use a wet classification therein in order to suppress the short pass in the first polymerization stage, because higher classification efficiency is generally attained with wet classification than that with by a dry classification. Further, in the case where a wet classification method of using a sedimentation liquid-power classifier is adopted, a liquid propylene can be used as a classifying medium. This is advantageous that the method can be conducted without necessity of specific solvents and unreacted propylene can be readily separated from polymer produced.

Incidentally, in the case where the gas phase polymerization is conducted in the first polymerization stage, the polymerization in the polymerization reactor may be carried out simultaneously with a dry classification, for example, by using a fluidized bed.

In accordance with the present invention, the reaction temperature for the polymerization in the first polymerization stage is not particularly restricted but usually 40° to 120° C., preferably 50° to 90° C. Also, the reaction pressure for the polymerization in the first polymerization stage is not particularly restricted but usually 1 to 100 atm, preferably 5 to 50 atm.

The polymerization in the first polymerization stage is conducted in the presence of hydrogen. The amount of hydrogen supplied to the polymerization reactor is not particularly restricted. Hydrogen can be fed in an amount sufficient to achieve a required melt flow rate (hereinafter referred to merely as "MFR") thereof.

The MFR of the propylene-based polymer obtained in the first polymerization stage can be determined optionally. In general, the polymerization conditions of the first polymerization stage can be adjusted such that the MFR is usually 0.1 to 3,000 g/10 min., preferably 1 to 300 g/10 min.

The weight ratio of the polymer obtained in the first polymerization stage to that of the finally produced polymer is not particularly restricted. However, in view of well balanced rigidity and impact resistance of the finally produced polymer, the amount of the polymer obtained in the first polymerization stage is usually 30 to 95% by weight, preferably 50 to 93% by weight based on the weight of the finally produced polymer. Specifically, taking into account a process performance of the second polymerization stage, the running conditions in the first polymerization stage are controlled so as to achieve the afore-mentioned weight ratio.

The average residence time of the polymer in the first polymerization stage is usually 0.1 to 8 hours, preferably 0.5 to 5 hours, more preferably 0.7 to 3.0 hours. Incidentally, the "average residence time" is a value obtained by dividing a retention amount of the polymer in the first polymerization stage by the weight of the polymer which is discharged from the first polymerization stage and supplied to the second polymerization stage per unit time.

Incidentally, it is preferred that the average CE of the polymer discharged from the first polymerization stage and supplied to the second polymerization stage is higher than a certain level. Here, the term "CE" means a catalytic activity which is defined as the weight of the polymer contained in unit weight of a solid content. When the average CE is low, not only costs for the catalyst but also the amount of catalyst residue contained in the finally produced polymer are increased, thereby disadvantageously causing deterioration in thermal stability and weather resistance of the polymer. Although the afore-mentioned problem can be suppressed by taking measures such as the increase in feed rate of additives or deashing treatment, both the measures are unfavorably accompanied with the increase in costs. Accordingly, the afore-mentioned average CE is preferably not less than 20,000 g/g, more preferably not less than 30,000 g/g.

In addition, when a relatively high content of rubber-like compound is required, in accordance with the present invention, the average particle size of the polymer discharged from the first polymerization stage and supplied to the second polymerization stage is preferably not less than 600 μm, more preferably 600 to 3,000 μm. Further, even if the average particle size is fallen within the afore-mentioned range, when the polymer contains too much amount of extremely small particles, the aim of the present invention may not be attained. For this reason, the content of the polymer having a particle size of not more than 300 μm is preferably not more than 25% by weight, more preferably 0 to 20% by weight.

In order to adjust the average particle size of the polymer to the afore-mentioned range, it is effective to control the average CE value thereof. If the average particle size of the solid catalyst component used for the polymerization is known, by using a so-called replica rule representing such a correlation that the polymer particles produced are similar in shape to the solid catalyst component, the average CE value required to fulfill the requirements according to the present invention can be calculated from the following formula:

$$D_p = D_{CAT}[1+\rho_{CAT}/\rho_{pp} \cdot CE]^{1/3}$$

wherein $D_p$ represents an average particle size of the polymer supplied to the second polymerization stage, $D_{CAT}$ represents an average particle size of the solid catalyst component, $\rho_{CAT}$ represents a density of the solid catalyst component and $\rho_{pp}$ represents a density of the polymer supplied to the second polymerization stage.

In the case where the condition complies with the replica rule, required CE values can be obtained without knowing the particle size of the solid catalyst component according to the following formula:

$$logD_p(1)-logD_p(2)=\tfrac{1}{3}[logCE(1)-logCE(2)]$$

wherein $D_p(1)$ represents an average particle size of the polymer having CE(1) and $D_p(2)$ represents an average particle size of the polymer having CE(2). Once the correlation between the CE and the average particle size is established by using the afore-mentioned formulae, the required CE relative to an optional particle size of the polymer can be obtained.

In accordance with the present invention, it is preferred that various polymerization conditions such as temperature, pressure or average residence time are controlled appropriately to make it possible to calculate the required CE from the afore-mentioned formulae. Incidentally, in the present invention, a weight-average particle size defined by a standard sieve is used as the average particle size of the polymer.

③ Characteristics of solid catalyst component and preferred preparation process thereof:

As described hereinbefore, in the present invention, the stereoregular polymerization catalyst capable of satisfying the specific properties requirements is used in the first polymerization stage (and the second polymerization stage).

The solid catalyst component used in the present invention may contain magnesium, titanium, chlorine and the electron-donar compound. The use of such a solid catalyst component makes it possible to obtain a catalyst having a high activity. The catalyst as defined in the present invention can also involve those prepared by supporting magnesium, titanium, chlorine and the electron-donar compound on a carrier composed primarily of metal oxides such as silica, alumina, silica/alumina, or mixed oxides.

The particle size distribution of the solid catalyst component used in the present invention is required to be sharp enough to satisfy the afore-mentioned requirement (1).

The term "n" in Rosin-Rammler distribution is used as an index representing the particle size distribution of particles. The Rosin-Rammler distribution means such a particle size distribution that its cumulative weight fraction is represented by the below-mentioned formula.

Figure 1B:
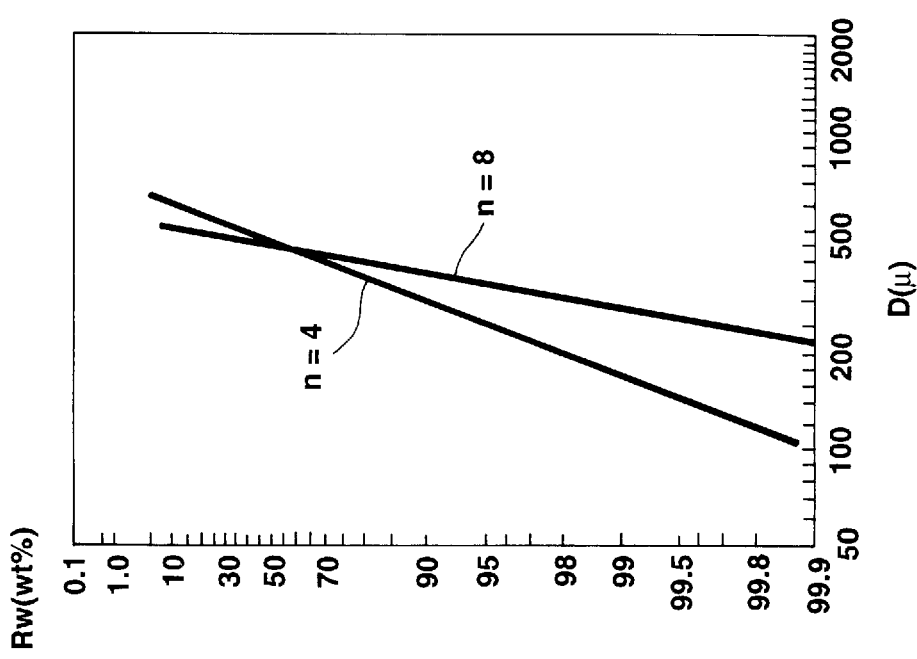

There are various ways to show the particle size distribution of polypropylene powder. It is known that the Rosin-Rammler plot is one of the useful ways to evaluate a particle size distribution. Rosin-Rammler distribution is expressed by the next equation when one uses weight % as the unit of $R_w$ (hereinafter weight % id referred to wt %):

$$R_w = 100 exp[-(ln2)(D/D_{50})^n] \text{ (wt \%)}$$

wherein $R_w$ is a cumulative weight fraction, D is a diameter of powder, $D_{50}$ is a weight average diameter at the point, where $R_w$=50 (wt %), and "n" is an index which represents the sharpness of the particle size distribution. And "ln" represents so-called normal logarithm to base e, FIG. 1(a) and FIG. 1(b) show an example of Rosin-Rammler distribution. One can see that the particle size distribution becomes sharp when "n" is large.

From the equation above, the following can be obtained.

$$log(2-logR_w) = n(logD-logD_{50}) + log(log2)$$

wherein "log" represents so-called common logarithm to base 10. This formula means that, when the particle size distribution is in accordance with Rosin-Rammler distribution at least approximately, a linear correlation between logD and log(2-logR$_w$) can be obtained. In this case, the slop gives us the value of "n".

Actual data about D and $R_w$ can be measured using standard sieve as explained in the examples hereinafter.

In the present invention, the particle size distribution of the catalyst needs to be sharp, i.e., "n" which can be obtained with Rosin-Rammler plot needs to be not less than five.

In Table 1, the effect of "n" is shown. It is clear that the number of gel is larger when "n" is less than five, and the impact strength thereof is lowered. Alternatively, when "n" is less than five, small particle accumulation occurred, thereby preventing the continuous operation of the process.

TABLE 1

| | Conditions | | Results | |
| --- | --- | --- | --- | --- |
| | n | EtOH/Al(m.r.) | number of gel (/250 cm$^2$) | others |
| Example 1 | 11.2 | 0.0 | 1592 | |
| Comparative Example 2 | 3.9 | 0.0 | 4410 | Small particle accumulation occurred |
| Example 7 | 6.5 | 1.2 | 195 | |
| Comparative Example 8 | 3.9 | 1.2 | 780 | Small particle accumulation occurred |

Since the particle size of the solid catalyst component is generally extremely small, it is difficult to directly measure the particle size distribution thereof. However, in the case of the polymerization using Ziegler-Natta catalysts, it is possible to measure the particle size distribution by using so-called replica rule that the polymer particles produced are similar in shape to the catalyst used for the production thereof.

That is, after polypropylene particles are produced by a batch polymerization process, the particle size distribution thereof is measured by using a standard sieve. Next, Rosin-Rammler plot is drawn based on the thus-measured particle size distribution to obtain a slope of a line approximated to the plot, thereby determining "n" of the polypropylene particles. In accordance with the present invention, the thus-determined "n" is defined as an index "n" of the solid catalyst component.

Incidentally, depending upon catalyst used, there are some cases in which it is difficult to obtain the line approximated to the Rosin-Rammler plot which is drawn based on the afore-mentioned particle size distribution of the polymer obtained by the batch polymerization process. In such a case, the index "n" is defined as a slope of a line passing through two points given by 20 wt % average particle size $D_{20}$ and 80 wt % average particle size $D_{80}$.

The index "n" of the solid catalyst component used in the present invention is not less than 5, preferably not less than 6, more preferably not less than 7, even more preferably not less than 8. In the case where the term "n" is less than 5, not only the effects of suppressing the short pass in the first polymerization step are deteriorated, but also operational troubles are likely to occur, because the content of small particles is increased as compared to the case where the index "n" is large.

Especially, in the case where there is adopted such a classification system that the polymer discharged from the polymerization reactor used in the first polymerization stage where the polymerization is conducted using liquid phase in the first polymerization as a solvent, are separated into a slurry containing large size particles having an average CE not less than 1.1 times that of the particles existing in the first polymerization stage, and a slurry containing small size particles having an average CE less than 1.1 times that of the particles existing in the first polymerization stage, there arise problems that the separation of the polymer particles becomes incomplete and a load applied to the process becomes large because the amount of the small size particles separated is increased.

Further, in the case where the small size particles separated by the classification system is circulated into the polymerization reactor in the first polymerization stage, there arise inconveniences that the volume of the polymerization reactor is substantially reduced and it becomes impossible to conduct a long-term continuous operation thereof due to the accumulation of the small size polymer particles therein. Furthermore, when a large amount of fine powder having a particle size of less than 75 μm is contained, more serious problems are likely to occur, because if a large amount of fine powder is contained, almost no fine powder is transferred from the classification system to the second polymerization stage, so that there is an increased risk of causing operation troubles such as clogging due to accumulation of the fine powder in the first polymerization stage.

As one of measures capable of eliminating these problems, there is a method using a solid catalyst component (A*) or those subjected to a preliminary polymerization process, which is obtained by contacting a reaction product (a*) produced by reacting a magnesium alkoxide or aryloxide compound (a1), a titanium alkoxide or aryloxide compound (a2), a silicon alkoxide or aryloxide compound (a3) and optionally an alcohol compound (a4), with a halogen-containing titanium compound (b*) and then heating the contacted product. Here, the "alcohol compound" may involve phenol compounds and silanol compounds. The solid catalyst component suitably used in the present invention is disclosed, for example, in Japanese Patent Applications Laid-open (Kokai) Nos. 52-98706 (1977), 59-6204 (1984), 59-182806 (1984), 61-181807 (1986), 1-54007 (1989), 3-72503 (1991), 4-89814 (1992) and 4-89815 (1992). Especially preferred solid catalyst components can be produced in the following manner.

The magnesium compounds (a1) suitably used in the present invention may be those represented by the general formula: $Mg(OR^1)_n(OR^2)_{2-n}$, wherein $R^1$ and $R^2$ may be the same or different and are individually an alkyl group (having about 1 to about 18 carbon atoms, preferably about 1 to about 12 carbon atoms), an aryl group (preferably a phenyl group or a lower ($C_1$–$C_4$) alkyl-substituted phenyl group), or an aralkyl group (of which aryl or alkyl moiety has preferably about 1 to about 8 carbon atoms); and $0 \leq n \leq 2$. Examples of the suitable magnesium compounds may include magnesium dialkoxides such as dimethoxy magnesium, diethoxy magnesium, di-iso-propoxy magnesium or di-n-butoxy magnesium; aryloxy magnesium such as diphenoxy magnesium or dibenzyl-oxy-magnesium; magnesium alkoxide-aryloxides such as ethoxy-phenoxy-magnesium; or the like. These magnesium compounds may be used singly or in the form of a mixture of any two or more different compounds.

The titanium compounds (a2) suitably used in the present invention may be those represented by the general formula: $Ti(OR^3)_{4-m}X_m$, wherein $R^3$ is an alkyl group (having about 1 to about 18 carbon atoms, preferably about 1 to about 12 carbon atoms), an aryl group (preferably a phenyl group or a lower ($C_1$–$C_4$) alkyl-substituted phenyl group) or an aralkyl group (of which aryl or alkyl moiety has preferably about 1 to about 8 carbon atoms); X is a halogen atom such as chlorine; and $0 \leq m < 4$. Examples of the titanium compounds (a2) may include titanium alkoxides such as tetramethoxy titanium, tetraethoxy titanium, tetra-n-propoxy titanium, tetra-n-propoxy titanium, tetra-iso-propoxy titanium or tetra-n-butoxy titanium, halogen-containing alkoxy titanium such as triethoxy titanium chloride, tri-iso-propoxy titanium chloride, tri-n-butoxy titanium chloride or di-n-butoxy titanium dichloride, or the like. These titanium compounds may be used singly or in the form of a mixture of any two or more different compounds.

The silicon compounds (a3) suitably used in the present invention may be those represented by the general formula: $Q_pSiX_k(OR^4)_{4-p-k}$, wherein Q and $R^4$ may be the same or different and are individually an alkyl group (having about 1 to about 18 carbon atoms, preferably about 1 to about 12 carbon atoms), an aryl group (preferably a phenyl group or a lower ($C_1$–$C_4$) alkyl-substituted phenyl group) or an aralkyl group (of which aryl or alkyl moiety has preferably about 1 to about 8 carbon atoms); X is a halogen atom such as chlorine; and $0 \leq p$, $0 \leq k$ and $0 < p+k < 4$. Examples of the silicon compounds may include (i) alkyl- and/or aryl-containing alkoxysilanes or aryloxysilanes such as methyl trimethoxysilane, methyl triethoxysilane, methyl-tri-n-butoxysilane, methyl-triphenoxysilane, ethyl-trimethoxysilane, ethyl-triethoxysilane, ethyl-tri-n-butoxysilane, ethyl-triphenoxysilane, phenyl-trimethoxysilane, phenyl-triethoxysilane, phenyl-tri-n-butoxysilane, phenyl-triphenoxysilane, dimethyl-dimethoxysilane, dimethyl-diethoxysilane, dimethyl-di-n-butoxysilane, dimethyl-diphenoxysilane, diethyl-dimethoxysilane, diethyl-diethoxysilane, diethyl-di-n-butoxysilane, di-ethyl-diphenoxysilane, diphenyl-dimethoxysilane, diphenyl-diethoxysilane, diphenyl-di-n-butoxysilane or diphenyl-diphenoxysilane; (ii) alkyl- and/or aryl-, and halogen-containing alkoxysilanes or aryloxysilanes such as methyl-dimethoxy-chlorosilane, methyl-diethoxy-chlorosilane, methyl-di-n-butoxy-chlorosilane, methyl-diphenoxy-chlorosilane, phenyl-dimethoxy-chlorosilane, phenyl-diethoxy-chlorosilane, phenyl-di-n-butoxy-chlorosilane or phenyl-diphenoxy-chlorosilane; (iii) alkoxysilanes or aryloxysilanes represented by the formula: $Si(OR^4)_4$, wherein $R^4$ has the same meaning as described above, such as tetramethoxysilane, tetraethoxysilane or tetra-n-butoxysilane or tetraphenoxysilane; (iv) halogen-containing alkoxysilanes or halogen-containing aryloxysilanes represented by the formula: $SiX_k(OR^4)_{4-k}$, wherein $R^4$ and k are the same meanings as described above, such as trimethoxy chlorosilane, triethoxy chlorosilane, tri-n-butoxy chlorosilane or triphenoxy chlorosilane; or the like. Incidentally, these silicon compounds may be used singly or in the form of a mixture of any two or more different compounds selected from the same group or different groups.

The alcohol compounds (a4) optionally used in the present invention may include phenol compounds or silanol compounds represented by the general formula: $R^5OH$, wherein $R^5$ is an alkyl group (having about 1 to about 18 carbon atoms, preferably about 1 to about 12 carbon atoms), an aryl group (preferably a phenyl group or a lower ($C_1$–$C_4$) alkyl-substituted phenyl group) or an aralkyl group (of which aryl or alkyl moiety has preferably about 1 to about 8 carbon atoms)(those groups may contain an etheric oxygen and/or a hydroxyl group); or the general formula: $R^6{}_3SiOH$, wherein $R^6$ is an alkyl group (having about 1 to about 18 carbon atoms, preferably about 1 to about 12 carbon atoms), an aryl group (preferably a phenyl group or a lower ($C_1$–$C_4$) alkyl-substituted phenyl group) or aralkyl group (these groups have the same meanings as described above with respect to $R^1$ to $R^4$, and may contain an etheric oxygen and/or a hydroxyl group). Examples of these alcohol compounds (a4) may include alcohols such as methanol, ethanol, n-propanol, iso-propanol, n-butanol, ethylene glycol, diethylene glycol, propylene glycol, cyclohexanol or benzyl alcohol, phenols such as phenol, cresol, xylenol or butyl phenol, silanols such as trimethyl silanol or triphenyl silanol, or the like. These alcohol compounds can be used singly or in the form of a mixture of any two or more different compounds selected from the same group or different groups.

Incidentally, it is preferred that any of these compounds (a1) to (a4) contain an aryloxy group.

When the magnesium compound (a1), the titanium compound (a2), the silicon compound (a3) and optionally the alcohol compound (a4) are contacted with each other to produce the contacted reaction product (a*), the order of the contact therebetween is not particularly restricted. These compounds are separately contacted with each other according to the aimed applications. In addition, the contact between these compounds is conducted in the presence of an inert hydrocarbon solvent such as hexane, heptane, octane, nonane, decane, toluene, xylene or the like. The temperature at which the afore-mentioned compounds are contacted with each other is not particularly restricted, but usually 10° C. to 250° C., preferably 100° C. to 180° C. The time for which these compounds are contacted with each other is also not particularly restricted, but usually about 0.5 to about 4 hours.

The molar ratio between these compounds used is as follows:

(a1):(a2):(a3):(a4)=1:0.05 to 4:0.05 to 5:0 to 2

The contacted reaction product (a*) of these compounds (a1) to (a4) may produce a homogeneous system or a heterogeneous system. That is, the contacted reaction product (a*) can be obtained as a liquid by varying the molar ratio between these compounds (a1) to (a4). However, in the process according to the present invention, especially preferred results can be obtained by causing any of these compounds to contain an aryloxy group, because the contacted reaction product (a*) is apt to be produced in the form of a slurry.

In the preferred embodiment of the present invention, the contacted reaction product (a*) is contacted with the electron-donar compound (c*) before or after contacted with the halogen-containing titanium compound (b*). In the case where the contacted reaction product (a*) is contacted with the electron-donar compound (c*) before the contact between the contacted reaction product (a*) and the halogen-containing titanium compound (b*), there can be used the following method.

That is, the contacted reaction product (a*) prepared in the afore-mentioned manner is contacted with the electron-donar compound (c*) in the presence or absence of an inert hydrocarbon solvent such as hexane, heptane, octane, nonane, decane, toluene or xylene, The method of the contact between the contacted reaction product (a*) and the electron-donar compound (c*) is not particularly restricted, but it is general that the electron-donar compound (c*) is added to the reaction system containing the contacted reaction product (a*). The temperature at which the contacted reaction product (a*) and the electron-donar compound (c*) are contacted with each other is not particularly restricted, but usually –50° C. to 200° C., preferably –40° C. to 50° C.

Further, the amount of the electron-donar compound (c*) used is not particularly restricted. However, in general, the electron-donar compound (c*) can be used in such an amount that the molar ratio thereof to magnesium contained in the contacted reaction product (a*) is as follows:

Mg:(c*)=1:0.01 to 2

As the electron-donar compounds (c*), there can be generally used the following oxygen-containing compounds.

The oxygen-containing compounds may include generally ethers, ketones, esters or alkoxy- or aryloxy-silanes.

(i) The ethers may be those compounds in which hydrocarbon groups bonded to the etheric oxygen have, as a total number, about 2 to about 18 carbon atoms, preferably about 4 to about 12 carbon atoms. Examples of the ethers may include diethyl ether, dipropyl ether, diethylene glycol-dimethyl ether, propylene glycol-dimethyl ether, ethylene oxide, tetrahydrofuran, 2,2,5,5-tetramethyl-tetrahydrofuran, dioxane or the like.

(ii) The ketones may be those compounds in which hydrocarbon groups bonded to the ketone carbonyl group have, as a total number, about 2 to about 18 carbon atoms, preferably about 4 to about 12 carbon atoms. Examples of the ketones may include acetone, diethyl ketone, methyl ethyl ketone, acetophenone or the like.

(iii) The esters may be those compounds of which carboxylic acid moiety is in the form of an aryl-substituted carboxylic acid or an aralkyl-substituted carboxylic acid (the aryl group or the aryl moiety of the aralkyl group is preferably phenyl or lower (about $C_1$–$C_4$) alkyl-substituted and/or lower (about $C_1$–$C_4$) alkoxy-substituted phenyl, the alkyl moiety of the aralkyl group has about 1 to about 6 carbon atoms, and the remaining carboxyl group has about 1 to about 3 carbon atoms), or in the form of an aliphatic carboxylic acid (the aliphatic hydrocarbon group except for the carboxyl group having about 1 to about 3 carbon atoms may contain an etheric oxygen and has about 1 to about 20 carbon atoms); and of which alcohol moiety has about 1 to about 20 carbon atoms, preferably about 2 to about 12 carbon atoms. The esters may involve intramolecular esters of hydroxy-substituted derivatives corresponding to the afore-mentioned carboxylic acids. Examples of the esters may include phenyl ethyl acetate, methyl benzoate, ethyl benzoate, phenyl benzoate, methyl toluate, ethyl toluate, methyl anisate, ethyl anisate, methoxy methyl benzoate, methoxy ethyl benzoate, dimethyl phthalate, diethyl phthalate, dipropyl phthalate, dibutyl phthalate, di-iso-butyl phthalate, dihexyl phthalate, methyl methacrylate, ethyl methacrylate, γ-butyrolactone, ethyl cellosolve, or the like.

(iv) The alkoxy- or aryloxy-silanes suitably used as the oxygen-containing compound may be those compounds which have at least one alkoxy or aryloxy group bonded to a silicon atom and having about 1 to about 12 carbon atoms, preferably about 1 to about 4 carbon atoms, and of which silicon atom is bonded, at the other binding sites thereof, to an alkyl group, an aryl group or an aralkyl group. Incidentally, the said alkyl group, the said aryl group or the said aralkyl group bonded to the silicon atom has the same meaning as described above. Specifically, the alkoxy- or aryloxy-silanes may include, for example, tetramethoxysilane, ethyl-trimethoxysilane, n-propyl-trimethoxysilane, iso-propyl-trimethoxysilane, t-butyl-trimethoxysilane, phenyl-trimethoxysilane, cyclohexyl-trimethoxysilane, 1-methyl-cyclohexyl-trimethoxysilane, 1,1,2,2-tetramethyl-propyl-trimethoxysilane, diethyl-dimethoxysilane, di-n-propyl-dimethoxysilane, di-iso-propyl-dimethoxysilane, diphenyl-dimethoxysilane, t-butyl-methyl-dimethoxysilane, t-butyl-ethyl-dimethoxysilane, t-butyl-n-propyl-dimethoxysilane, t-butyl-iso-propyl-dimethoxysilane, cyclohexyl-methyl-dimethoxysilane, dicyclohexyl-dimethoxysilane, 1-methyl-cyclohexyl-methyl-dimethoxysilane, 1,1,2,2-tetramethyl-propyl-methyl-dimethoxysilane, ethyl-triethoxysilane, n-propyl-triethoxysilane, iso-propyl-triethoxysilane, t-butyl-triethoxysilane, phenyl-triethoxysilane, cyclohexyl-triethoxysilane, 1-methyl-cyclohexyl-triethoxysilane, 1,1,2,2-tetramethyl-propyl-triethoxysilane, diethyl-diethoxysilane, di-n-propyl-diethoxysilane, di-iso-propyl-diethyoxysilane, diphenyl-diethoxysilane, t-butyl-methyl-diethoxysilane, t-butyl-ethyl-diethoxysilane, t-butyl-n-propyl-diethoxysilane, cyclohexyl-methyl-diethoxysilane, cyclohexyl-ethyl-diethoxysilane, 1-methyl-cyclohexyl-methyl-diethoxysilane, 1,1,2,2-tetramethyl-propylmethyl-diethoxysilane, or the like.

Among these oxygen-containing compounds, the esters and the alkoxy- or aryloxy-silane are preferably used, and the esters are more preferably used. Among the esters, aryl carboxylic acid esters are preferable. Phthalic acid esters are more preferably used, and diethyl phthalate is even more preferably used.

After the component (a*) is contacted with the component (c*), the resultant product is contacted with the halogen-containing titanium compound (b*) and then heat-treated to obtain the solid catalyst component (A*) suitably used in the present invention.

Examples of the halogen-containing titanium compounds (b*) used above may include titanium tetrahalides such as $TiCl_4$ or $TiBr_4$, halogen-containing alkoxy- or aryloxy-titanium such as $Ti(O—n—C_4H_9)Cl_3$ or $Ti(OC_6H_5)Cl_3$, or the like. In this case, the alkyl or aryl moieties of the alkoxy or aryloxy group are an alkyl group (having about 1 to about 18 carbon atoms, preferably about 1 to about 12 carbon atoms) or an aryl group (preferably a phenyl group or a lower ($C_1$-$C_4$) alkyl-substituted phenyl group).

The afore-mentioned contact processes may be carried out in the presence or absence of an inert hydrocarbon solvent such as hexane, heptane, octane, nonane, decane toluene or xylene. In general, it is advantageous to the production process to use a solvent having a somewhat high boiling point, such as toluene.

The contact between these components can be generally carried out at a temperature of not more than 20° C., preferably −80° C. to 10° C., more preferably −50° C. to 0° C. By limiting the contact temperature to such a low level, the resultant contacted product is apt to be produced in the form of a homogeneous liquid. Further, by heating the homogeneous liquid product to deposit a solid therefrom, it is possible to obtain the solid catalyst component having considerably good particle properties.

On the other hand, in the case where the contacted reaction product (a*) is contacted with the electron-donar compound (c*) after the contact with the halogen-containing titanium compound (b*) but before the precipitation of the solid, the contact process can be carried out in the following manner.

The preceding contact between the components (a*) and (b*) is carried out in the afore-mentioned manner. That is, these components are generally contacted with each other at a temperature of not more than 20° C., preferably in the range of −80° to 10° C., more preferably −50° C. to 0° C. As described above, when the contact is carried out at such a low temperature, the resultant contacted product is apt to be produced in the form of a homogeneous liquid. Also, the contact process may be carried out in the presence or absence of an inert hydrocarbon solvent such as hexane, heptane, octane, nonane, decane toluene or xylene, but it is generally advantageous to the production process to use a solvent having a somewhat high boiling point, such as toluene. As the halogen-containing component (b*), the compounds identical to those described above can also be used.

The thus-obtained contacted product is then contacted with the component (c*) before the precipitation of solid. If the contact temperature is increased, the solid precipitation is likely to occur. Therefore, the contact process is generally conducted at a temperature of not more than 20° C., preferably in the range of −80° to 10° C., more preferably −50° C. to 0° C.

By using the afore-mentioned methods in which the component (c*) is contacted with (a*) and the resultant product is contacted with the halogen-containing titanium compound (b*) or the component (c*) is contacted with the contacted product of the components (a*) and (b*) before solid precipitation, it is possible to obtain the solid catalyst component having a high stereo-regularity.

The amount of the halogen-containing component (b*) used is not particularly restricted whatever methods are used for the contact between the component (c*) and the other components. However, in general, the molar ratio of the component (b*) to magnesium in the contacted reaction product (a*) may be fallen within the following range.

Mg:(b*)=1:0.5 to 20

When the components (a*), (b*) and (c*) are contacted with each other in the afore-mentioned manner, it is possible to obtain the solid catalyst component usable in the present invention. Further, in order to enhance powder properties of the solid catalyst component, there can be used a method of controlling a rate of the temperature rise.

That is, it is preferred that the average temperature rising rate is generally not more than 2.0° C./min., preferably not more than 1.0° C./min. up to 50° C. In this case, the temperature rise is not necessarily conducted uniformly. The reaction system may be cooled and/or may be kept constant for a while in the course of the temperature rise. When the average temperature rise is limited to such a low level, it is possible to obtain a catalyst having excellent particle properties such as bulk density, particle size distribution and reduction in amount of fine powder.

The treatment temperature after the temperature rise is not particularly restricted. Generally, it is preferred that a treatment temperature of more than 110° C. is used to produce the solid catalyst component (A*). However, when the treatment temperature is too high, the activity of the catalyst produced is rather deteriorated. Therefore, the treatment temperature is preferably more than 110° C. and not more than 170° C.

The time required for one treatment is not particularly restricted, but generally in the range of 0.5 to 12 hours. In addition, the contact treatment with the component (b*) may be carried out a plurality of times. In this case, the temperature rising rate subsequent to the second treatment can be determined optionally.

After the afore-mentioned treatments, the resultant contacted product may be washed with an inert hydrocarbon solvent such as hexane, heptane, octane, nonane, decane, toluene or xylene to obtain a slurry of the solid catalyst component (A*).

An example of combinations of the afore-mentioned components which are suitable to obtain the solid catalyst component (A*) having a high performance as a catalyst for olefin polymerization, is illustrated below.

(a1): $Mg(OR)_2$ wherein R is an alkyl group or an aryl group;

(a2): $Ti(OR)_4$ wherein R is an alkyl group;

(a3): $RSi(OR)_3$ wherein R is an aryl group and/or an alkyl group, plus $Si(OR)_4$ wherein R is an alkyl group;

(c*): diethyl phthalate; and (d*): $TiCl_4$, where any of the components (a1) to (a3) has an aryloxy group.

The thus-obtained solid catalyst component (A*) can be fed into a reactor as it is to obtain an olefin polymer. However, in order to obtain a powder having better particle properties, it is preferred that the solid catalyst component (A*) is further contacted with an organoaluminum compound (B*) and olefin (C*) to conduct a preliminary polymerization treatment, thereby forming a solid catalyst component.

As the organoaluminum compounds (B*) used in the preliminary polymerization treatment, there can be used those appropriately selected from the organoaluminum compounds (B) exemplified above as the polymerization catalysts for the production of the block copolymers according to the present invention. Specific examples of the organoaluminum compounds (B*) may include trialkyl aluminum such as trimethyl aluminum, triethyl aluminum, tri-n-propyl aluminum, tri-iso-butyl aluminum or trihexyl aluminum, halogen-containing organoaluminum compounds such as diethylaluminum chloride or sesqui-aluminum chloride, hydride-containing organoaluminum compounds such as diethyl aluminum hydride, alkoxide-containing organoaluminum compounds such as dimethyl aluminum methoxide, diethyl aluminum methoxide or diethyl aluminum phenoxide, aluminoxane such as methyl aluminoxane, ethyl aluminoxane or iso-butyl aluminoxane, or the like. These organoaluminum compounds (B*) can be used singly or in the form of a mixture of any two or more thereof. Incidentally, the organoaluminum compound (B*) may be generally used in such an amount that the molar ratio of aluminum in the component (B*) to titanium in the component (A*) is in the range of 0.1 to 100.

The olefins usable as the component (C*) may be those having carbon-carbon double bond which is polymerizable in the presence of Ziegler-Natta catalysts. Specific examples of the olefins as the component (C*) may include α-olefins such as ethylene, propylene, 1-butene, 1-pentene, 1-hexene, 3-methyl-1-butene, 3-methyl-1-pentene, 4-methyl-1-pentene, vinyl cyclohexane, styrene or divinyl benzene, or olefins other than α-olefin such as 2-butene, 2-pentene, cyclopentene or cyclohexene, or the like. These olefins as the component (C*) may be used singly or in the form of a mixture of any two or more thereof. The component (C*) may be used in an amount of 0.1 to 1000 parts by weight, preferably 0.5 to 300 parts by weight, more preferably 0.5 to 50 parts by weight, even more preferably to 3 parts by weight based on one part by weight of the solid catalyst component (A*). At least a part of the olefin as the component (C*) is virtually contacted with the components (A*) plus (B*) in the preliminary polymerization treatment, thereby producing 0.1 to 1000 parts by weight of the preliminaryly-treated polymer based on one part by weight of the solid catalyst component (A*).

The contact between the aforementioned components may be suitably carried out either in the presence of an inert hydrocarbon solvent such as butane, pentane, hexane, heptane or toluene or substantially without any solvent. In view of the removal of heat and the feed of catalyst, it is preferred that the contact is carried out in the presence of the inert hydrocarbon solvent.

The method of contacting the components (A*), (B*) and (C*) with each other can be selected optionally. The components can be contacted simultaneously or in a sequential manner. Further, the contact may be conducted a plurality of times. The contact temperature is usually −20° C. to 130° C., preferably 0° C. to 70° C. Further, the contact can be carried out either in a batch process or in a continuous process. Further, the contact is carried out in the presence of the electron-donar compound. The electron-donar compound used for the contact can be appropriately selected from those compounds exemplified above with respect to the electron-donar compounds to be fed in the polymerization reactor in the first polymerization step.

Among these electron-donar compounds, the organosilicon compounds represented by the following general formula (I) can be preferably used.

$$(R^7)(R^8)_n Si(OR^9)_{3-n} \qquad (I)$$

wherein $R^7$ is branched or cyclic alkyl group, $R^8$ is alkyl having 1 to 10 carbon atoms, aralkyl or aryl, $R^9$ methyl or ethyl, and n is 1 or 2. Preferably, in the formula (I), $R^7$ is a branched or cyclic alkyl group having 3 to 12 carbon atoms; $R^8$ is an alkyl group having 1 to 10 carbon atoms, an aralkyl group having 7 to 12 carbon atoms or an aryl group having 6 to 12 carbon atoms; $R^9$ is an methyl or ethyl group; and n is 1 or 2. Among them, those compounds having a t-butyl group as $R^7$ are more preferable.

It is preferred that the weight ratio between the solid catalyst component, the organoaluminum compound and the organosilicon compound, which are contacted with each other in the preliminary polymerization treatment, satisfies the following conditions:

[Aluminum in the organoaluminum compound]/[Solid catalyst component]≧0.1 (mol/kg)

[Silicon in the organoaluminum compound]/[Solid catalyst component]≧0.2 (mol/kg)

In the case where the liquid-power classifier is used, among the polymer particles supplied to the classifier, large size particles have a tendency to be moved downward and sedimented reversely to a counter flow liquid within the classifier. The classification point mainly depends on classification conditions such as the velocity of the counter flow, the density and viscosity of the liquid therein, the density of particles, the sphericity of the particles, the average particle size to be discharged, the concentration of particles in the discharge point, and so on.

For example, the classification point is about 250 μm in the case where the liquid is propylene, the temperature of the liquid is 70° C., the particle is homopolypropylene powder, the velocity of counter flow is 3 cm/sec, the sphericity of the particles is about 0.8, the average particle size to be discharged from the classifier is from 400 to 500 μm, and the concentration of particles in the discharged point is about 50% by weight.

The meaning of classification point is as follows. That is, a particle having a particle size less than the classification point does not sediment due to counter flow and removed from the upper portion of the classifier. On the other hand, a particle having a particle size not less than the classification point has a probability of sedimentation against the counter flow within the classifier. As a result, the particle which sediments within the classifier is separated and discharged from the port provided on a cylinder portion of the classifier and then transported to the second polymerization stage. The discharge probability of particles increases with increasing particle size. Thus the particles supplied to the classifier are separated into the two parts depending upon their particle size, i.e., the part removed from the upper portion of the classifier contains a large amount of small particles, especially particles having the particle size less than classification point, while the rest which sediments within the classifier contains a large amount of large particles, especially particles having the particle size not less than classification point.

The weight ratio of slurry supplied to the classifier and the slurry discharged from the classifier is not particularly restricted as long as there is no supply neck. However, in general, the ratio above may be fallen within the following range:

Slurry supplied: Slurry discharged=1:2 to 50

The thus-obtained slurry containing a large amount of small particles may or may not be circulated to the initial polymerization reactor. However, from the standpoint of improvement in unit of the catalyst, it is preferred that the slurry be circulated to the polymerization reactor.

Incidentally, in the case where the liquid-power classifier is used, it is preferred that the classifier is used in combination with a thickener for concentrating the slurry. In this case, a liquid cyclone, a centrifugal separator or a filtering apparatus can be suitably used as the thickener. Especially, in the case of a continuous process, the hydrocyclone is preferably used because of its good operability, compactness, inexpensiveness and small installation space.

By selecting operation conditions of the liquid-power classifier appropriately, it is possible to separate the slurry into a supernatant liquid containing substantially no particles and a concentrated slurry. When the thus-obtained concentrated slurry is supplied to the afore-mentioned classifier and the supernatant liquid is used as the counter flow liquid for the classifier, it is possible to reduce an amount of liquid used in the process, thereby advantageously decreasing a load of the process.

In addition, if necessary, the slurry discharged from the polymerization reactor used in the first polymerization stage can also be supplied to the liquid-power classifier. The slurry discharged from the upper portion of the classifier is then supplied to the liquid cyclone where the slurry is separated into a supernatant liquid containing substantially no particles and a concentrated slurry. The supernatant liquid containing substantially no particles is then used as a counter flow liquid for the classifier and the concentrated slurry obtained in the liquid cyclone is circulated to the initial polymerization reactor used in the first polymerization stage.

It may be optionally determined whether the slurry discharged from the polymerization reactor used in the first polymerization stage is first supplied to any of the thickener such as a liquid cyclone and the classification system such as a liquid-power classifier. However, it is advantageous that the slurry be first supplied to the classification system, because the pressure loss in the process can be limited to a low level and the feed pump used for supplying the slurry can be miniaturized. Further, in this case, there is caused an additional merit that a region for controlling a flow rate of the supernatant liquid obtained from the thickener becomes large.

2) Transportation of polymer:

Among the polymer particles thus-obtained from the first polymerization stage, the polymer particles satisfying the aforementioned requirement (2), i.e., particles having particle size not less than the classification point, which is decided by the afore-mentioned classification conditions, are transported to the second polymerization stage. Here, in the case where the liquid phase is used as a reaction medium for the first polymerization stage, the polymer in the form of a slurry is transported to the second polymerization stage. In this case, it is preferred that the polymer be adjusted to such a state substantially free from liquid before the slurry reaches a gas phase polymerization reactor used in the second polymerization stage. If the polymer containing liquid is supplied to the gas phase polymerization reactor in the second polymerization stage, there arise inconveniences such as wide temperature distribution in the gas phase polymerization reactor, and there increase in heterogeneous flowability of the polymer.

Especially, in the case where liquid propylene is used as a reaction medium for the first polymerization stage, the afore-mentioned problem can be eliminated by employing a degassing system to vaporize the liquid propylene. The degassing system used is not particularly restricted, but a system constituted by a double tube-type heat exchanger and a fluidized flash vessel can be suitably used.

3) Second polymerization stage:

In the gas phase polymerization in the second polymerization stage, propylene is copolymerized with α-olefin other than propylene in the presence of the propylene-based polymer produced in the first polymerization stage under the influence of the stereoregular polymerization catalyst used in the first polymerization stage. In this case, the term "under the influence of the stereoregular polymerization catalyst used in the first polymerization stage" means that at least a part of the copolymerization in the second polymerization stage is caused or continued by the activity of the stereoregular polymerization catalyst used in the first polymerization stage. Accordingly, the copolymerization reaction in the second polymerization stage may comprise a copolymerization reaction substantially an entire part of which is induced by the activity of the stereoregular polymerization catalyst accompanied with the polymer transported from the first polymerization stage to the second polymerization stage, and a copolymerization reaction which is induced by combined activities of the catalyst supplied from the first polymerization stage and a catalyst or catalyst components newly added to the second polymerization stage.

However, since the feature of the present invention resides in that the requirements (1) and (2) are simultaneously satisfied, it is preferred that the copolymerization reaction in the second polymerization stage can be conducted only under the influence of the stereoregular polymerization catalyst supplied from the first polymerization stage. However, it is rather preferable that components other than the solid catalyst component, e.g., the organoaluminum compound component, the electron-donar compound and/or an activity-controlling agent are replenished or newly added for the copolymerization reaction in the second polymerization stage.

The gas phase polymerization in the second polymerization stage can be conducted in a manner suitable for the aimed applications except for the use of polymer/catalyst particles having the specific CE value and supplied from the first polymerization stage.

The α-olefins usable in the second polymerization stage may be preferably those having 2 to 12 carbon atoms. Examples of these α-olefins may include ethylene, 1-butene, 1-pentene, 1-hexene or the like. Among these α-olefins, ethylene or 1-butene is more preferably used, and ethylene is even more preferably used.

The concentration of propylene in the gas phase is generally less than 90 mol %, preferably in the range of 30 to 85 mol %. When the concentration of propylene is adjusted to such a range, the finally produced block copolymer tends to be improved in its impact resistance.

As active hydrogen compounds supplied to the second polymerization stage, there can be used water, alcohols, phenols, carboxylic acids, sulfonic acids, amines except tertiary amines or the like.

More specifically, as the alcohols, there can be used aliphatic alcohols having 1 to 12 carbon atoms, e.g., methanol, ethanol, n-propyl alcohol, i-propyl alcohol, n-butyl alcohol, n-hexyl alcohol, n-octyl alcohol, n-dodecanol, 2-ethylhexyl alcohol, cyclohexanol, ethylene glycol or propylene glycol, alcohols having functional groups, e.g., methoxy ethanol, ethoxy ethanol or diethylene glycol, or the like.

As the phenols, there can be used phenol, cresol, xylenol, t-butyl phenol, 2,6-dimethyl-4-t-butyl phenol, or the like.

The carboxylic acids may be those having 1 to 12 carbon atoms, and include, for example, formic acid, acetic acid, propionic acid, butyric acid, stearic acid, acrylic acid, methacrylic acid, benzoic acid, salicylic acid or the like.

As the sulfonic acids, there can be used methane-sulfonic acid, ethane-sulfonic acid, benzene-sulfonic acid, toluene-sulfonic acid, 4-ethyl-benzene-sulfonic acid or the like.

As the amines except tertiary amines, there can be used methyl amine, ethyl amine, n-propyl amine, i-propyl amine, n-butyl amine, n-octyl amine, cyclohexyl amine, aniline, benzyl amine, dimethyl amine, diethyl amine, di-n-propyl amine, di-i-propyl amine, di-n-butyl amine, di-n-octyl amine, dicyclohexyl amine, diphenyl amine, dibenzyl amine, or the like.

These active hydrogen compounds can be used singly or in the form of a mixture of any two or more thereof.

Among these active hydrogen compounds, those compounds having a relatively low boiling point and a low odor emission is preferably used. Among them, alcohols having a small number of carbon atoms (e.g., carbon number being 1 to 5 can be more preferably used, and ethanol can be even more preferably used.

The amount of the active hydrogen compound supplied to the second polymerization stage is not particularly restricted. Preferably, the active hydrogen compound comprises both the components supplied from the first polymerization stage and newly added in the second polymerization stage.

The molar ratio of the active hydrogen compound to aluminum in the organoaluminum compound supplied to the second polymerization stage is more than 1.0. If the molar ratio is less than 1.0, there is a tendency that effects of improvement in impact resistance and/or particle fluidity are somewhat deteriorated as compared to the case where the molar ratio of more than 1.0 is used.

From the standpoint of improvement in impact resistance, it is preferred that the molar ratio of the active hydrogen compound to aluminum in the organoaluminum compound is high. However, when the molar ratio is too high, the polymerization activity for the rubber is considerably deteriorated. This is disadvantageous from the viewpoint of productivity. Accordingly, the active hydrogen compound is supplied in such an amount that the molar ratio of the active hydrogen compound to aluminum in the organoaluminum compound supplied to the second polymerization stage is preferably more than 1.0 and less than 3.0, more preferably 1.1 to 2.5.

The method of supplying the active hydrogen compound can be optionally selected. The active hydrogen compound can be dissolved in a solvent such as n-hexane or toluene to form a solution supplied to the second polymerization stage. Alternatively, the active hydrogen compound can be directly supplied to the second polymerization stage without a solvent.

Further, the active hydrogen compound can be supplied at any optional position as long as the copolymerization of propylene with α-olefin in the second polymerization stage can be conducted in the presence of the active hydrogen compound.

More specifically, there may be adopted a method of supplying the active hydrogen compound into the gas phase polymerization reactor of the second polymerization stage from below a dispersing plate thereof, a method of supplying the active hydrogen compound to a bed layer composed of polymer particles in the gas phase polymerization reactor, a method of supplying the active hydrogen compound to the bed layer from above, a method of supplying the active hydrogen compound into the degassing vessel disposed between the first and second polymerization stages, a method of supplying the active hydrogen compound into a feed pipe disposed between the degassing vessel and the gas phase polymerization reactor of the second polymerization stage, or the like. The active hydrogen compound can be supplied at one position or two or more positions, if required. Among the afore-mentioned methods, the method of supplying from below the dispersing plate of the gas phase polymerization reactor is preferably used to effectively disperse the active hydrogen compound in the reactor.

The amount of the polymer produced in the second polymerization stage can be varied depending upon the amount of the polymer produced in the first polymerization stage. In general, the amount of the polymer produced in the second polymerization stage can be appropriately selected from the range of 5 to 70% by weight, preferably 7 to 50% by weight based on the total weight of the polymer produced in the first and second polymerization stages so as to attain well-balanced relationship between rigidity and impact resistance thereof.

The temperature, time and pressure used in the copolymerization reaction in the second polymerization stage are not particularly restricted. However, in view of the afore-mentioned weight ratio, the polymerization temperature is usually 0° to 100° C., preferably 25° to 90° C.; the polymerization time is usually 0.1 to 6 hours, preferably 0.5 to 3 hours; and the polymerization pressure is usually 0.1 to 100 atm, preferably 1 to 40 atm. Incidentally, the polymerization time is defined as an average residence time of the polymer in the second polymerization stage.

The molecular weight of the copolymer produced in the second polymerization stage is optionally selected. However, in order to obtain well-balanced correlation between physical properties and moldability, the weight-average molecular weight Mw of the copolymer is usually in the range of 200,000 to 3,000,000, preferably 400,000 to 2,000,000. Incidentally, hydrogen is usually used to control a molecular weight of the copolymer. The melt flow ratio (MFR) of the finally produced block copolymer is determined by the MFR of the polymer transported from the first polymerization stage to the second one, the molecular weight of the copolymer produced in the second polymerization stage and the weight ratio thereof based on the total weight of the polymer produced in the first and second polymerization stages. The MFR of the block copolymer is not particularly restricted. However, in view of its moldability, the MFR is usually in the range of 0.01 to 3,000 g/10 min, preferably 0.1 to 1,000 g/10 min.

Type or kind of the reactor used as the gas phase polymerization reactor in the second polymerization stage is not particularly restricted. That is, any known type reaction vessels such as a fluidized bed, an agitating fluidized bed or an agitating vessel can be used as the polymerization reactor.

Further, after completion of polymerizations in the first and second polymerization stages, third or subsequent polymerization stages can be continuously conducted, if required. The third or subsequent polymerization stages can be conducted while maintaining the concentration of propylene in the gas phase at less than 90 mol %, thereby enabling copolymerization of propylene with ethylene, homopolymerization of ethylene, copolymerization of ethylene with other α-olefin, or the like.

EXAMPLES

The present invention is described in more detail by way of the following examples. However, these examples are only illustrative and not intended to constitute a limitation of the present invention, and it is to be understood that other and further changes and modifications can be made without departing from the sprits and the scope of the present invention.

Measurement of various properties:

(a) The amount of xylene-insoluble component ($II_{OXYL}$) as an index of the stereoregularity was measured by the following method. That is, about 1 g of polypropylene powder sample was accurately weighed in an eggplant-shaped flask. 200 ml of xylene was charged into the flask. The mixture was heated and boiled to completely dissolve the polypropylene powder in xylene. Thereafter, the mixture was rapidly cooled in a water bath maintained at 25° C. to precipitate a solid. The precipitated solid was then filtered to obtain a filtrate. 50 ml of the thus-obtained filtrate was evaporated and dried in a platinum dish, and further dried in vacuo to measure a weight of the dry product. $II_{OXYL}$ was determined as the amount of xylene-insoluble component in the polypropylene powder sample using the weight of the thus-obtained dry product.

(b) The ethylene-propylene rubber (EPR) content was measured by temperature-rise elution fractional method using a temperature-rise elution fractional apparatus ("CFC-T-102L" manufactured by Mitsubishi Chemical Co., Ltd.) under the conditions shown in Table 2. Incidentally, EPR was regarded as an elution component fractionated at a temperature of not more than 40° C.

TABLE 2

| Items | Conditions |
| --- | --- |
| Concentration of sample | 2.0 mg/ml |
| Solvent (flow rate) | Ortho-dichlorobenzene (1.0 ml/min) |

TABLE 2-continued

| Items | Conditions |
| --- | --- |
| Column size | 0.46 mmϕ × 15 cm |
| Filler | glass (0.1 mmϕ) |
| Rate of temperature drop | 1.0° C./min |
| Temperature rising rate | 1.0° C./min |
| Amount charged | 0.5 ml |
| GPC column | TSK GMHXL-HT (8 mmϕ × 30 cm) × 3 |
| GPC measuring temperature | 135° C. |
| Detector | 1R (MIRAN 1A) |
| Measuring wavelength | 3.42 μm |
| Molecular weight | calculated as PP |

(c) The bulk density ($\rho_B$) was measured according to JIS-K-6721.

(d) The particle size distribution of polymer was measured by using a standard sieve (manufactured by MITA-MURA RIKEN CO., LTD). The index "n" which was a slope of the Rosin-Rammler plot, was used as a measure of the particle size distribution. As described, the "n" for the polymer produced by a batch polymerization process was defined as "n" of the solid catalyst component. The fraction having a particle size of less than 106 μm was regarded as "fine powder" and represented by "% by weight".

(e) The MFR was measured according to JIS-K-6758.

(f) The Ti content in polypropylene was measured by press-forming polypropylene into a sheet having a thickness of 100 μm and subjecting the sheet to fluorescent X-ray analysis.

(g) The amount of a low molecular weight component which was contained in the rubber component and bled out on a surface of the polymer (hereinafter referred to as "CHS") was measured in the following manner.

5 g of propylene-based block copolymer was accurately weighed in a 300 ml beaker. 300 ml of n-hexane was added to the beaker. The resultant mixture in the beaker was agitated for 5 minutes while maintaining at 25° C. After the mixture was filtered to remove n-hexane, 300 ml of n-hexane was added again thereto. After the mixture was filtered again to remove n-hexane, the thus-obtained polymer residue was dried at 100° C. for one hour. The CHS was obtained as weight percentage of reduction in weight of the polymer to an initial weight of the polymer.

(h) The properties of the propylene-based block copolymer were measured in the following manner.

100 parts by weight of polymer powder was blended with 0.075 part by weight of a phenol-based anti-oxidant ("IRGANOX 1010" produced by Chiba Geigy AG.), 0.03 part by weight of a phosphorus-based heat stabilizer ("IRGAPHOS 168" produced by Chiba Geigy AG.), 0.075 part by weight of calcium stearate as a lubricant (produced by Nippon Yuka Co., Ltd.) and 0.3 part by weight of talc as a nucleating agent. The blend was intimately mixed by Henschel mixer to prepare a sample. The sample was charged from a hopper sealed by a nitrogen gas into an 40 mmϕ extruder (manufactured by OHSAKA SEIKI CO., LTD.), and extruded therefrom at 220° C. and 100 rpm (screw revolution) to obtain pellets.

The thus-obtained pellets were injection-molded using an injection-molding apparatus ("N70BII" manufactured by Nippon Seiko Co., Ltd.), of which plasticizing cylinder and die were maintained at temperatures of 220° C. and 20° C., respectively, to prepare a test piece for measuring physical properties. After the injection-molding, the test piece was allowed to stand in a thermostatic chamber maintained at 23° C. for four to seven days. Thereafter, the test piece was subjected to measurements of physical properties including flexural modulus, Izod impact strength and facial impact strength.

(i) The flexural modulus was measured at room temperature of 23±1° C. according to JIS-K-7203.

(j) The Izod impact strength was also measured at room temperature of 23±1° C. according to JIS-K-7110.

(k) The facial impact strength as a measure of low-temperature impact strength was measured in the following manner. An impactor having a curvature radius of ½ inch was placed vertically on the injection-molded test piece having a size of 38 mm$\phi$×2.0 mm and maintained at −30° C. An impact load was dropped on the impactor to measure a breaking energy. Incidentally, four test pieces were used for the measurement of the breaking energy at each point. The minimum energy required to break the two among the four test pieces was determined as the facial impact strength.

(l) The measurement of fish eyes was conducted in the following manner.

A part of the above-prepared pellets were molded into a film having a thickness of 30 $\mu$m using an extruder equipped with T-shaped dice. The film was observed to count the number of fish eyes having a diameter of not less than 0.05 mm per 250 cm$^2$.

Meanwhile, in the following Examples, "Me", "Et", "Bu" and "Ph" represents an methyl group, an ethyl group, an n-butyl group and a phenyl group, respectively.

EXAMPLE 1

(1) Production of Solid Catalyst Component (A)

2.058 mol of Mg(OEt)$_2$ was charged into a four-necked 3-liter round flask equipped with a vacuum-stirrer and a thermometer. Successively, Ti(OBu)$_4$ was charged into the flask in such an amount that the molar ratio of Ti(OBu)$_4$ to magnesium in Mg(OEt)$_2$ charged was 0.60. The mixture was heated while agitating at 300 rpm.

The mixture was reacted at 150° C. for 1.5 hours and then cooled to 120° C. A toluene solution of MeSi(OPh)$_3$ was added to the mixture in such an amount that the molar ratio of MeSi(OPh)$_3$ to magnesium in Mg(OEt)$_2$ charged was 0.67. After the addition, the mixture was reacted at the same temperature for one hour. After completion of the reaction, the mixture was cooled to room temperature, and Si(OEt)$_4$ was added to the mixture in such an amount that the molar ratio of Si(OEt)$_4$ to magnesium in Mg(OEt)$_2$ charged was 0.05, to obtain a slurry of the contact product (a*).

The entire amount of the thus-obtained slurry was transported to an induction stirring-type 10 liter autoclave equipped with a cooling and heating jacket, and diluted with toluene to obtain a dilute slurry containing 0.60 mol of magnesium per one liter of toluene.

The dilute slurry was cooled to −10° C. while stirring at 300 rpm. Diethyl phthalate was added to the slurry in such an amount that the molar ratio of diethyl phthalate to magnesium in Mg(OEt)$_2$ charged was 0.10. Successively, TiCl$_4$ was dropped into the slurry for 1.2 hours in an amount that the molar ratio of TiCl$_4$ to magnesium in Mg(OEt)$_2$ charged was 4.0, thereby obtaining a homogeneous solution. At this time, there was observed no phenomenon that the slurry was changed into gel due to increase in viscosity thereof.

The thus-obtained homogeneous solution was heated at a temperature rising rate of 0.5° C./min up to 15° C., and maintained at that temperature for one hour. Successively, the solution was heated at a temperature rising rate of 0.5° C./min up to 50° C. and maintained at that temperature for one hour. Further, the solution was heated at a temperature rising rate of 1.0° C./min up to 117° C. and retained at that temperature for one hour.

After completion of the treatment, the heating and the stirring were stopped to draw out a supernatant liquid. Thereafter, the residue was washed with toluene until reaching a residual liquid ratio of 1/55, thereby obtaining a solid slurry.

Next, after the amount of toluene in the thus-obtained solid slurry was so adjusted that the concentration of TiCl$_4$ was 2.0 mol per one liter of toluene. TiCl$_4$ was added to the solid slurry at room temperature in such an amount that the molar ratio of TiCl$_4$ to magnesium in Mg(OEt)$_2$ initially charged was 5.0. The solid slurry was heated while stirring at 300 rpm and reacted at 117° C. for one hour.

After completion of the reaction, the heating and the stirring were stopped to draw out a supernatant liquid. Thereafter, the residue was washed with toluene until reaching a residual liquid ratio of 1/150, thereby obtaining a toluene slurry of a solid catalyst component (A*) (before prepolymerization).

The entire amount of the thus-obtained slurry was transported to a reactor equipped with Pfaudler 3-blade type impeller having an inner diameter of 660 mm and a length of cylindrical portion of 770 mm, and diluted with n-hexane to adjust the concentration of the solid catalyst component (A*) to 3 g/liter. While stirring the thus-obtained slurry at 300 rpm, triethyl aluminum was added thereto at 25° C. such that the ratio of triethyl aluminum to the solid catalyst component (A*) was 3.44 millimol/g. Further, t-butyl-n-propyl-dimethoxysilane was added to the slurry such that the ratio of t-butyl-n-propyl-dimethoxysilane to the solid catalyst component (A*) was 1.44 millimol/g. After the additions, the slurry was maintained at 25° C. for 30 minutes while continuously stirring.

Next, a propylene gas was fed to a liquid phase of the slurry at a constant rate (for example, 10 g of propylene per minute) for 72 minutes. After the feed of the propylene gas was stopped, the slurry was washed with n-hexane by a precipitation washing method, to adjust a residual liquid ratio to 1/12, thereby obtaining a slurry of a solid catalyst component (A). The thus-obtained solid catalyst component (A) contained 2.7 g of propylene polymer per 1 g of the component (A*).

(2) Measurement of Particle Size Distribution 2.7 millimol of triethyl aluminum and 0.05 millimol of t-butyl-n-propyl-dimethoxysilane were charged into an induction stirring-type 2-liter autoclave at room temperature in the presence of a nitrogen stream. Next, after 750 g of liquid propylene was further charged into the autoclave, hydrogen was added thereto in such an amount that the hydrogen concentration of gas phase at 70° C. was 11,0 mol %.

The mixture was heated while stirring to 70° C. at which 10.6 mg of the solid catalyst component (A*) produced in Example 1(1) was added to initiate the polymerization.

After the polymerization was conducted at 70° C. for one hour, an excess amount of propylene was purged to terminate the polymerization. The yield of propylene polymer was 478 g. The thus-obtained propylene polymer had a polymerization activity (K) of 1,500 g/g·Hr·atm, a content of xylene-insoluble component (II$_{OXYL}$) of 98.9%, a bulk density ($_{\rho B}$) of 0.49 g/cc and "n" of 11.2.

Incidentally, the polymerization activity (K) is defined as a yield (g) of polymer per one hour, per 1 atm of monomer pressure and per one gram of the component (A*).

(3) Production of Propylene-Ethylene Block Copolymer

Figure 2:
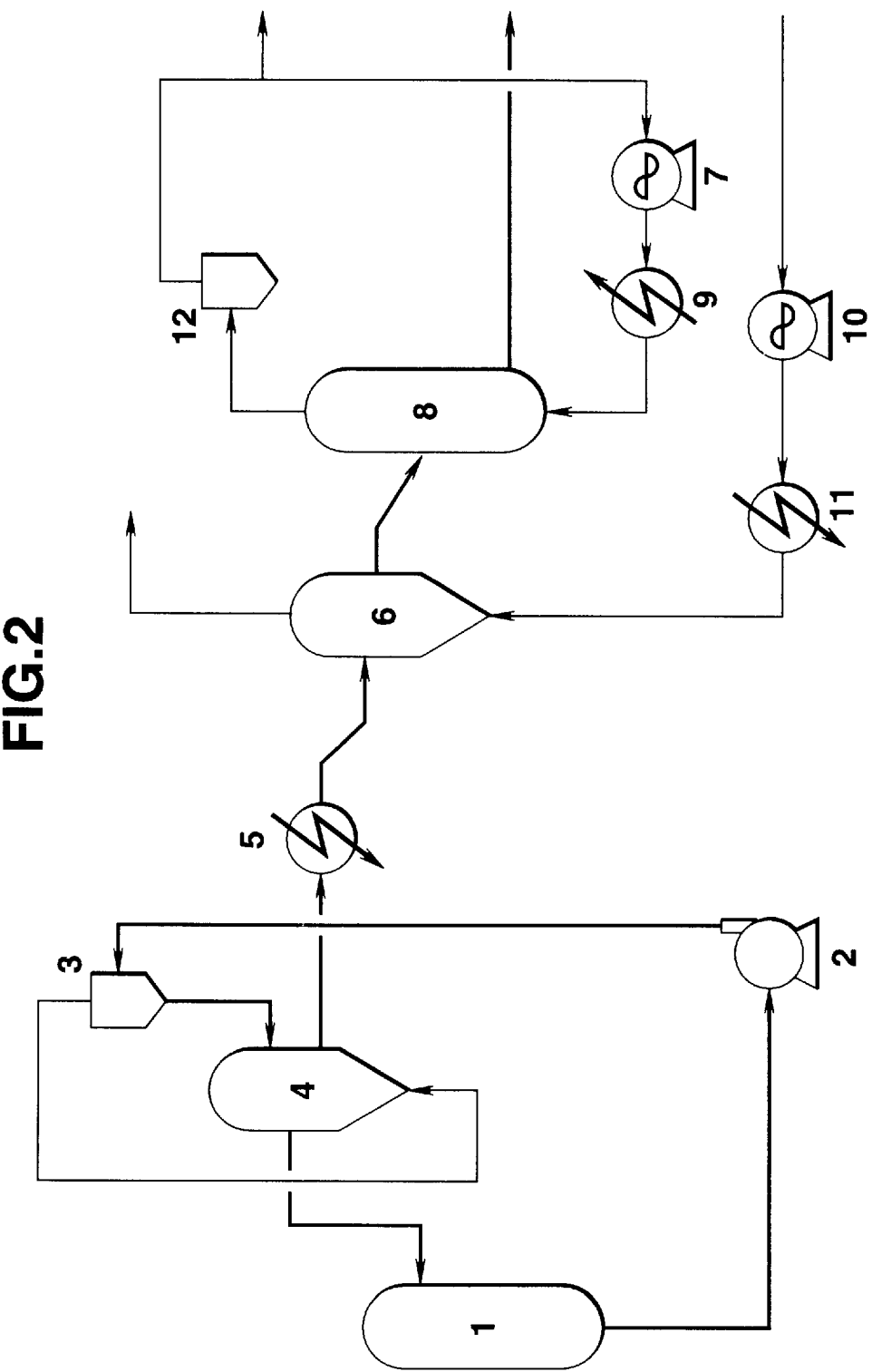
FIG. 2 is a flow diagram of a system for carrying out a process of Example 1.

The continuous production of propylene-ethylene block copolymer was carried out by using a process system shown in FIG. 2, in which a classification system constituted by a thickener 3 (liquid cyclone) and a sedimentation liquid-power classifier 4, and a degassing system constituted by a double pipe-type heat exchanger 5 and a fluidized flash vessel 6, were incorporated between a liquid-phase polymerization reactor 1 having a capacity of 1.7 m$^3$ and equipped with a stirrer and an agitation-type gas phase polymerization reactor 8 having a capacity of 1.9 m$^3$.

Liquid propylene was supplied into the polymerization vessel at a feed rate of 115 kg/hr, and hydrogen was also supplied thereinto in such an amount that the concentration of hydrogen in the gas phase was 10 mol %. In addition, triethyl aluminum and t-butyl-n-propyl-dimethoxysilane were also fed into the polymerization reactor at rates of 48.5 g/hr and 1.5 g/hr, respectively. Further, the solid catalyst component (A*) produced in Example 1(1) was fed into the vessel at a rate of 0.64 g/hr.

The polymerization temperature was adjusted to 70° C., the polymerization pressure to 32 kgf/cm$^2$ as a total pressure, the partial pressure of propylene to 28 kgf/cm$^2$, and the liquid amount in the polymerization reactor to 1 m$^3$.

The slurry polymerized in the polymerization reactor 1 had a concentration (solid content) of about 15% by weight. The slurry was fed into the thickener 3 at a volume flow rate of about 12 m$^3$/hr by a slurry pump 2. From the upper portion of the thickener 3, a supernatant liquid containing substantially no solid particles was discharged and fed to the bottom of the liquid-power classifier 4 at a linear velocity of 4.0 cm/sec. On the other hand, the high-concentration slurry (for example, more than 0% by weight and not more than 70% by weight) discharged from the lower portion of the thickener 3 was supplied to the upper portion of the liquid-power classifier 4, and contacted with the afore-mentioned supernatant liquid in a counter flow manner.

The slurry discharged from the upper portion of the liquid-power classifier 4 was circulated to the polymerization vessel 1 because of the inclusion of fine powder. On the other hand, the slurry containing a large amount (e.g., not less than 50% by weight) of large particles (e.g., the particle size is not less than 515 μm) was discharged from the lower portion of the liquid-power classifier 4. The concentration of the thus-discharged slurry was about 30% by weight. The drawing-out rate of the slurry was adjusted to 40 kg/hr when calculated in terms of polypropylene particles contained in the slurry.

The polypropylene discharged from the lower portion of the liquid-power classifier 4 was retained in the polymerization reactor 1 and the circulating line for an average residence time of 1.8 hours. The average particle size (D$_p$50) of the polypropylene was 515 μm; the average CE was 63,000 g/g; and the polymerization activity (K) was 1,240 g/g·Hr·atm. Incidentally, this CE value was well consistent with the CE value obtained by measuring the Ti content of the polypropylene particles. In addition, no fine powder having a particle size of less than 75 μm was contained in the thus-obtained polypropylene particles, and the content of small particles having a particle size of less than 180 μm was as low as 0.4% by weight.

On the other hand, in order to obtain an average CE of polypropylene particles existing in the first polymerization stage, the slurry was sampled from the suction line of the slurry pump 2. The sampled slurry was purged to remove propylene therefrom, thereby obtaining polypropylene powder. From the Ti content in the thus-obtained particles, it was found that the average CE of the polymer was 43,000 g/g. Incidentally, the average particle size of the polymer particles was 455 μm.

The slurry discharged from the bottom of the afore-mentioned liquid-power classifier 4 was fed through the downstream double pipe-type heat exchanger 5 into the fluidized flash vessel 6. While a heated propylene gas was supplied into the fluidized flash vessel 6 from the bottom thereof, an interior of the vessel 6 was maintained at 70° C. The thus-obtained solid polypropylene particles were transported to the gas phase polymerization reactor 8 to copolymerize propylene with ethylene.

In the gas phase polymerization vessel 8 on which agitating blades were supplementarily provided to enhance mixing effects, a gaseous mixture composed of ethylene, propylene, hydrogen and nitrogen was circulated by a gas blower 7. In this case, ethylene and propylene were fed in such an amount that a sum of partial pressures of ethylene and propylene was 10,6 kgf/cm$^2$ and the molar fraction of propylene was maintained at a constant value of 55 mol %, while hydrogen was fed in such an amount that the hydrogen concentration was maintained at 2.3 mol %. Incidentally, the polymerization temperature and the average residence time in the vapor polymerization reactor 8 was adjusted to 60° C. and 0.6 hour, respectively.

When the polymer particles discharged from the gas phase polymerization reactor 8 was analyzed, it was found that the MFR was 31.4 g/10 min, the bulk density was 0.36 g/cc, the EPR content was 15.0% by weight, and the fish eye content was 1592/250 cm$^2$.

(4) Evaluation of Physical Properties

As a result of the evaluation of physical properties of the block copolymer produced in Example 1(3), it was found that the flexural modulus was 14,800 kg/cm$^2$, the Izod impact strength was 8.0 kg·cm/cm and the facial impact strength was 65 kg·cm.

COMPARATIVE EXAMPLE 1

(1) Production of Propylene-Ethylene Copolymer

Figure 4:
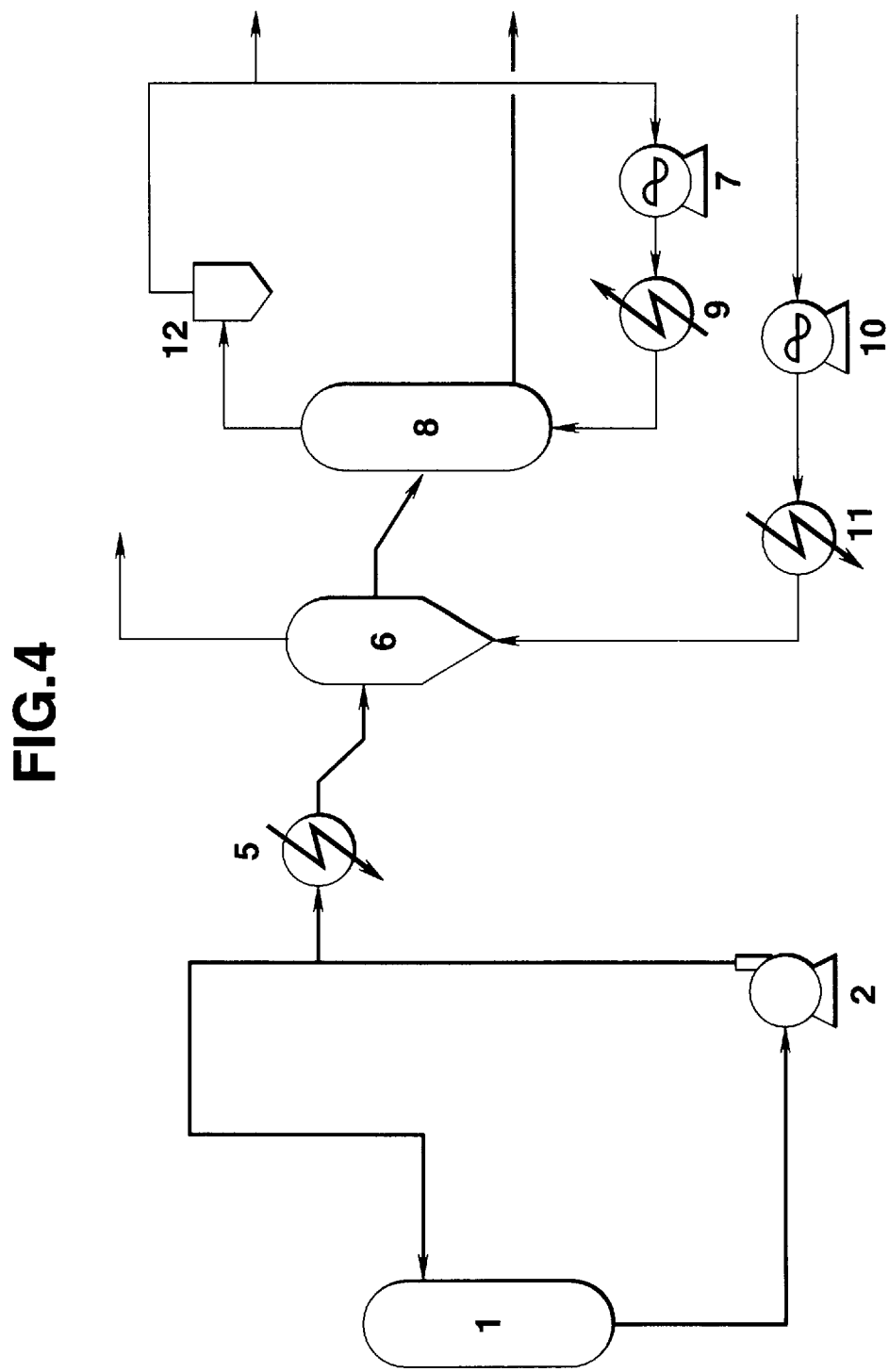
FIG. 4 is a flow diagram of a system for carrying out a process of Comparative Example 1.

The continuous production of propylene-ethylene block copolymer was conducted in the same manner as defined in Example 1(3) except for using a process system shown in FIG. 4, which removed the classification system constituted by the thickener 3 and the precipitation liquid-power classifier 4 from that shown in FIG. 1.

Since the classification system was removed from the process system, the average CE of the propylene polymer existing in the first polymerization stage became identical to that of the propylene polymer transported to the second polymerization stage. Further, it was found that the polymer product contained 1.0% by weight of fine powder having a particle size of less than 75 μm, and 5.5% by weight of small particles having a particle size of less than 180 μm.

When the polymer particles discharged from the gas phase polymerization reactor 8 was analyzed, it was found that the MFR was 31.0 g/10 min, the bulk density was 0.33 g/cc, and the EPR content was 14.9% by weight. Incidentally, the fish eye content was not less than 10,000/250 cm$^2$, so that the accurate evaluation thereof was impossible.

(2) Evaluation of Physical Properties

As a result of the evaluation of the block copolymer obtained in Comparative Example 1(1), it was found that the flexural modulus was 14,200 kg/cm$^2$, the Izod impact strength was 6.2 kg·cm/cm and the facial impact strength was 30 kg·cm.

COMPARATIVE EXAMPLE 2

(1) Production of Solid Catalyst Component (A)

The production of the solid catalyst component was conducted in the same manner as defined in Example 1(1) except that diethyl phthalate was charged in such an amount that the molar ratio of diethyl phthalate to Mg was 0.20 and the temperature was elevated from −10° C. to 117° C. at a temperature rising rate of 2.5° C./min.

(2) Measurement of Particle Size Distribution

The same procedure as defined in Example 1(2) was conducted except that the solid catalyst component prepared in Comparative Example 2(1) was used. As a result, 223 g of propylene polymer was produced. The propylene polymer produced had an polymerization activity (K) of 700 g/g·Hr·atm, a content of xylene insoluble component (II$_{OXYL}$) of 98.4%, a bilk density ($\rho_B$) of 0.45 g/cc, and "n" of 3.9. The content of the fine powder was 0.2% by weight.

(3) Production of Propylene-Ethylene Block Copolymer

The same procedure as defined in Example 1(3) was conducted except that the solid catalyst component produced in Comparative Example 2(1) was used.

When the polymer particles discharged from the gas phase polymerization reactor 8 was analyzed, it was found that the MFR was 32.7 g/10 min; the bulk density was 0.37 g/cc; the EPR content was 15.0% by weight; and the fish eye content was 4410/250 cm$^2$.

Incidentally, the small particles were accumulated in the propylene polymerization reactor in the first polymerization stage with elapsed time, which made the continuous operation impossible.

(4) Evaluation of Physical Properties

The block copolymer produced in Comparative Example 2(3) was evaluated for various properties. As a result, it has been found that the flexural modulus was 14,700 kg/cm$^2$, the Izod impact strength was 6.5 kg·cm/cm, and the surface impact strength was 35 kg·cm.

EXAMPLE 2

(1) Production of Propylene-Ethylene Block Copolymer

The continuous production of propylene-ethylene block copolymer was carried out by the same process system as shown in FIG. 2 of Example 1.

The same procedure as defined in Example 1(3) was conducted except that the operational conditions of propylene polymerization reactor was so changed that the solid catalyst component (A*) produced in Example 1(1) was fed at a rate of 0.72 g/hr. Further, the supernatant liquid was fed from the thickener 3 (cyclone) to the bottom of the liquid-power classifier 4 at a linear velocity of 3.8 cm/sec.

The polypropylene discharged from the lower part of the liquid-power classifier 4 was retained in the polymerization reactor 1 for an average residence time of 1.4 hours. The average particle size (D$_p$50) of the polypropylene was 495 μm; the average CE was 57,000 g/g; and the polymerization activity (K) was 1,450 g/g·Hr·atm. Incidentally, this CE value was well consistent with the CE value obtained by measuring Ti content of the polypropylene. In addition, no fine powder having a particle size of less than 75 μm was contained in the thus-obtained polypropylene particles, and the content of small particles having a particle diameter of less than 180 μm was as low as 0.2% by weight.

On the other hand, the average CE of polypropylene particles existing in the first polymerization stage was obtained in the same manner as defined in Example 1(3). As a result, it was found that the average CE was 43,000 g/g. Incidentally, the average particle size of the polypropylene particles was 450 μm.

The operational conditions of the gas phase polymerization reactor 8 was controlled in such a manner that a sum of partial pressures of ethylene and propylene was maintained at 13.2 kgf/cm$^2$ and the average residence time thereof in the vapor polymerization reactor 8 was 0.6 hour. Further, ethanol as an active hydrogen compound was fed into the vessel in such an amount that the molar ratio of ethanol to aluminum contained in the polymer particles supplied to the gas phase polymerization reactor was 2.0.

When the polymer particles discharged from the gas phase polymerization reactor 8 was analyzed, it was found that MFR was 31.0 g/10 min, the bulk density was 0.50 g/cc, the EPR content was 14.4% by weight, and the fish eye content was 249/250 cm$^2$.

(2) Evaluation of Physical Properties

As a result of the evaluation of physical properties of the block copolymer produced in Example 2(1), it was found that the flexural modulus was 14,900 kg/cm$^2$, the Izod impact strength was 9.7 kg·cm/cm and the facial impact strength was 95 kg·cm.

COMPARATIVE EXAMPLE 3

(1) Production of Propylene-Ethylene Copolymer

The continuous production of propylene-ethylene block copolymer was conducted in the same manner as defined in Example 2(3) except for using a process system shown in FIG. 4 of Comparative Example 1, which removed the classification system constituted by the thickener 3 and the precipitation liquid-power classifier 4 from that shown in FIG. 2.

Since the classification system was removed from the process, the average CE of the propylene polymer existing in the first polymerization stage became identical to that of the propylene polymer transported to the second polymerization stage.

When the polymer particles discharged from the gas phase polymerization reactor 8 was analyzed, it was found that the MFR was 31.0 g/10 min, the bulk density was 0.47 g/cc, and the EPR content was 14.9% by weight. Incidentally, the fish eye content was not less than 10,000/250 cm$^2$, so that the accurate evaluation thereof was impossible.

(2) Evaluation of Physical Properties

As a result of the evaluation of the block copolymer obtained in Comparative Example 3(1), it was found that the flexural modulus was 14,000 kg/cm$^2$, the Izod impact strength was 6.1 kg·cm/cm and the facial impact strength was 30 kg·cm. This indicated that the polymer product was deteriorated in balance between the flexural modulus and the impact resistance.

COMPARATIVE EXAMPLE 4

(1) Production of Solid Catalyst Component (A)

The production of the solid catalyst component was conducted in the same manner as defined in Example 2 (1) except that diethyl phthalate was charged in such an amount that the molar ratio of diethyl phthalate to Mg was 0.20 and the temperature was elevated from −10° C. to 117° C. at a temperature rising rate of 2.5° C./min.

(2) Measurement of Particle Size Distribution

The same procedure as defined in Example 2(2) was conducted except that the solid catalyst component produced in Comparative Example 4(1) was used. As a result, 223 g of propylene polymer was produced. The propylene polymer produced had an polymerization activity (K) of 700 g/g·Hr·atm, a content of xylene insoluble component ($II_{OXYL}$) of 98.4%, a bilk density ($\rho_B$) of 0.45 g/cc, and "n" of 3.9. In addition, the content of the fine powder was 0.2% by weight.

(3) Production of Propylene-Ethylene Block Copolymer

The same procedure as defined in Example 2(3) was conducted except that the solid catalyst component produced in Comparative Example 4(1) was used.

When the polymer particles discharged from the gas phase polymerization reactor 8 was analyzed, it was found that the MFR was 32.7 g/10 min; the bulk density was 0.47 g/cc; the EPR content was 15.0% by weight; and the fish eye content was 430/250 cm².

Incidentally, the small particles were accumulated in the propylene polymerization reactor 1 in the first polymerization stage with passage of time, which made the continuous operation impossible.

(4) Evaluation of Physical Properties

The block copolymer produced in Comparative Example 4(3) was evaluated for various properties. As a result, it was found that the flexural modulus was 14,700 kg/cm², the Izod impact strength was 7.8 kg·cm/cm, and the surface impact strength was 80 kg·cm.

EXAMPLE 3

(1) Production of Solid Catalyst Component (A)

20 mol of Mg(OEt)$_2$ was charged into a 100-liter autoclave equipped with a jacket for heating and cooling, an agitator and a baffle. Successively, Ti(OBu)$_4$ was charged into the autoclave in such an amount that the molar ratio of Ti(OBu)$_4$ to magnesium in Mg(OEt)$_2$ charged was 0.45. The mixture was heated while agitating at 165 rpm.

The mixture was reacted at 135° C. for 2.0 hours and then cooled to 125° C. A toluene solution of MeSi(OPh)$_3$ was added to the mixture in such an amount that the molar ratio of MeSi(OPh)$_3$ to magnesium in Mg(OEt)$_2$ charged was 0.67. After the addition, the mixture was reacted at the same temperature for four hours. After completion of the reaction, the reaction mixture was cooled to 25° C., and Ti(OBu)$_4$ and Si(OEt)$_4$ were added to the reaction mixture in such an amount that the molar ratio of Ti(OBu)$_4$ to magnesium in Mg(OEt)$_2$ charged was 0.15 and the molar ratio of Si(OEt)$_4$ to magnesium in Mg(OEt)$_2$ charged was 0.05, thereby obtaining a slurry of the contact product (a*).

Next, the thus-obtained slurry was diluted with toluene to obtain a dilute slurry containing 0.58 mol of Mg per one liter of toluene. Thereafter, the dilute slurry was cooled to −10° C. while stirring at 165 rpm. Diethyl phthalate was added to the slurry in such an amount that the molar ratio of diethyl phthalate to magnesium in Mg(OEt)$_2$ charged was 0.10. Successively, TiCl$_4$ was dropped into the slurry for 6.0 hours in such an amount that the molar ratio of TiCl$_4$ to magnesium in Mg(OEt)$_2$ charged was 4.0, thereby obtaining a homogeneous solution. At this time, there was observed no phenomenon that the slurry was changed into gel due to increase in viscosity thereof.

The thus-obtained homogeneous solution was heated at a temperature rising rate of 20° C./Hr up to 15° C. and maintained at that temperature for one hour. Further, the solution was heated at a temperature rising rate of 20° C./Hr up to 50° C. and maintained at that temperature for one hour. Further, the solution was heated at a temperature rising rate of 120° C./Hr up to 117° C. and retained at that temperature for one hour.

After the treatment, the heating and the stirring of the solution were stopped to remove a supernatant liquid therefrom. Thereafter, the obtained residue was washed with toluene until reaching a residual liquid ratio of 1/55, to obtain a solid slurry.

Next, after the amount of toluene in the thus-obtained solid slurry was adjusted such that the concentration of TiCl$_4$ was 1.5 mol per one liter of toluene. TiCl$_4$ was added to the solid slurry at 25° C. in such an amount that the molar ratio of TiCl$_4$ to magnesium in Mg(OEt)$_2$ initially charged was 5.0. The solid slurry was heated while stirring at 165 rpm and reacted at 117° C. for one hour.

After completion of the reaction, the heating and the stirring were stopped to draw out a supernatant liquid. Thereafter, the obtained residue was washed with toluene until reaching a residual liquid ratio of 1/150, to obtain a toluene slurry of a solid catalyst component (A*).

A part of the thus-obtained solid slurry was transported to a reactor equipped with Pfaudler 3-blade type impeller having an inner diameter of 660 mm and a length of cylindrical portion of 770 mm, and diluted with n-hexane to adjust the concentration of the solid catalyst component (A*) to 3 g/liter. While stirring the thus-obtained slurry at 300 rpm, triethyl aluminum was added thereto at 25° C. in such an amount that the ratio of triethyl aluminum to the solid catalyst component (A*) was 3.44 millimol/g. Further, t-butyl-ethyl-dimethoxysilane was added to the slurry in such an amount that the ratio of t-butyl-ethyl-dimethoxysilane to the solid catalyst component (A*) was 1.44 millimol/g. After the additions, the slurry was maintained at 25° C. for 30 minutes while continuously stirring.

Next, a propylene gas was fed to a liquid phase of the slurry at a constant rate (for example, 100 g propylene per minute) for 72 minutes. After the feed of the propylene gas was stopped, the slurry was washed with n-hexane by a precipitation washing method, to adjust a residual liquid ratio thereof to 1/12, thereby obtaining a slurry of a solid catalyst component (A). The thus-obtained solid catalyst component (A) contained 2.9 g of propylene polymer per 1 g of the component (A*).

(2) Measurement of Particle Size Distribution 2.7 millimol of triethyl aluminum and 0.05 millimol of t-butyl-ethyl-dimethoxysilane were charged into an induction stirring-type 2-liter autoclave at room temperature in the presence of a nitrogen stream. Next, after 750 g of liquid propylene was further charged into the autoclave, hydrogen was added thereto in such an amount that the hydrogen concentration in gas phase at 70° C. was 11.0 mol %.

While stirring, the mixture was heated to 70° C. at which 10.6 mg of the solid catalyst component (A*) produced in Example 3(1) was added to initiate the polymerization.

After the polymerization was conducted at 70° C. for one hour, an excess amount of propylene was purged to terminate the polymerization. It was found that the yield of the thus-produced propylene polymer was 353 g, and that the propylene polymer had a polymerization activity (K) of 1,110 g/g·Hr·atm, a content of xylene-insoluble component ($II_{OXYL}$) of 98.9%, a bulk density ($\rho_B$) of 0.49 g/cc, and "n" of 8.6. Further, no fine powder was produced.

(3) Production of Propylene-Ethylene Block Copolymer

The continuous production of propylene-ethylene block copolymer was conducted by the using process system as shown in FIG. 2 of Example 1.

The same procedure as defined in Example 1(3) was conducted except that the propylene polymerization reactor 1 was operated under such conditions that the solid catalyst component (A*) produced in Example 3(1) was fed at a feed rate of 0.83 g/Hr and t-butyl-ethyl-dimethoxysilane was fed at a feed rate of 1.3 g/Hr instead of t-butyl-n-propyl-dimethoxysilane. Further, the supernatant liquid was fed from the thickener 3 (cyclone) to the bottom of the liquid-power classifier 4 at a linear velocity of 4.1 cm/sec.

The polypropylene and catalyst discharged from a lower portion of the liquid-power classifier 4 was retained in the propylene polymerization reactor 1 and the circulating line for an average residence time of 2.1 hours. The average particle size ($D_p50$) was 450 µm; the average CE was 49,000 g/g; and the polymerization activity (K) was 830 g/g·Hr·atm. Incidentally, this CE value was well consistent with the CE value obtained by measuring the Ti content of the polypropylene particles. In addition, no fine powder having a particle size of less than 75 µm was contained in the thus-obtained polypropylene particles, and the content of relatively small particles having a particle diameter of less than 180 µm was as low as 0.2% by weight.

On the other hand, the same procedure as defined in Example 1(3) was conducted to obtain an average CE of polypropylene particles existing in the first polymerization stage. As a result, it was found that the average CE of the polymer was 35,000 g/g. Incidentally, the average particle size of the polymer particles was 400 µm.

The operational conditions of the gas phase polymerization reactor 8 were adjusted such that a sum of partial pressures of ethylene and propylene was 13.2 kgf/cm² and the average residence time therein was 1.3 hours. Further, ethanol as an active hydrogen compound was fed in such an amount that the molar ratio of ethanol to aluminum contained in the polymer particles in the gas phase polymerization reactor 8 was 1.8.

When the polymer particles discharged from the gas phase polymerization reactor 8 was analyzed, it was found that the MFR was 31.8 g/10 min, the bulk density was 0.46 g/cc, the EPR content was 14.4% by weight, and the fish eye content was 139/250 cm².

(4) Evaluation of Physical Properties

As a result of the evaluation of physical properties of the block copolymer produced in Example 3(3), it was found that the flexural modulus was 15,400 kg/cm², the Izod impact strength was 9.7 kg·cm/cm and the facial impact strength was 95 kg·cm.

EXAMPLE 4

(1) Production of Solid Catalyst Component (A)

20 mol of Mg(OEt)$_2$ was charged into a 100-liter autoclave equipped with a jacket for heating and cooling, an agitator and a baffle. Successively, Ti(OBu)$_4$ was charged into the autoclave in such an amount that the molar ratio of Ti(OBu)$_4$ to magnesium in Mg(OEt)$_2$ charged was 0.60. The mixture was heated while agitating at 165 rpm.

The mixture was reacted at 150° C. for 1.0 hour and then cooled to 120° C. A toluene solution of MeSi(OPh)$_3$ was added to the mixture in such an amount that the molar ratio of MeSi(OPh)$_3$ to magnesium in Mg(OEt)$_2$ charged was 0.67. After the addition, the mixture was reacted at the same temperature for one hour. After completion of the reaction, the reaction mixture was cooled to 25° C., and Si(OEt)$_4$ was added to the reaction mixture in such an amount that the molar ratio of Si(OEt)$_4$ to magnesium in Mg(OEt)$_2$ charged was 0.05, thereby obtaining a slurry of the contact product (a*).

Next, the thus-obtained slurry was diluted with toluene to obtain a dilute slurry containing 0.59 mol of Mg per one liter of toluene. Thereafter, the dilute slurry was cooled to −10° C. while stirring at 165 rpm. Diethyl phthalate was added to the cooled slurry in such an amount that the molar ratio of diethyl phthalate to magnesium in Mg(OEt)$_2$ charged was 0.10. Successively, TiCl$_4$ was dropped into the slurry for 2.5 hours in such an amount that the molar ratio of TiCl$_4$ to magnesium in Mg(OEt)$_2$ charged was 4.0, thereby obtaining a homogeneous solution. At this time, there was observed no phenomenon that the slurry was changed into gel due to increase in viscosity thereof.

Subsequently, the same procedure as defined in Example 3(1) was conducted to obtain a toluene slurry of the solid catalyst component (A*) and then a slurry of the solid catalyst component (A). The thus-obtained solid catalyst component (A) contained 2.9 g of the propylene polymer per one gram of the component (A*).

(2) Measurement of Particle Size Distribution 2.7 millimol of triethyl aluminum and 0.05 millimol of t-butyl-ethyl-dimethoxysilane were charged into an induction stirring-type 2-liter autoclave at room temperature in the presence of a nitrogen stream. Next, after 750 g of liquid propylene was further charged into the autoclave, hydrogen was added thereto in such an amount that the hydrogen concentration in gas phase at 70° C. was 11.0 mol %.

While stirring, the mixture was heated to 70° C. at which 10.6 mg of the solid catalyst component (A*) produced in Example 4(1) was added to initiate the polymerization.

After the polymerization was conducted at 70° C. for one hour, an excess amount of propylene was purged to terminate the polymerization.

It was found that the yield of the thus-produced propylene polymer was 350 g, and that the propylene polymer had a polymerization activity (K) of 1,100 g/g·Hr·atm, a content of xylene-insoluble component ($II_{OXYL}$) of 98.9%, a bulk density ($\rho_B$) of 0.50 g/cc, and "n" of 10.6. Further, no fine powder having a particle size of less than 75 µm was produced.

(3) Production of Propylene-Ethylene Block Copolymer

The continuous production of propylene-ethylene block copolymer was conducted by using the process system as shown in FIG. 2 of Example 1.

The same procedure as defined in Example 3(3) was conducted except that the propylene polymerization reactor 1 was operated under such conditions that the solid catalyst component (A*) produced in Example 4(1) was fed at a feed rate of 0.91 g/Hr. Further, the supernatant liquid was fed from the thickener 3 (cyclone) to the bottom of the liquid-power classifier 4 at a linear velocity of 4.5 cm/sec.

The polypropylene discharged from a lower portion of the liquid-power classifier 4 was retained in the propylene polymerization reactor 1 for an average residence time of 1.0 hour. The average particle size ($D_p50$) was 445 μm; the average CE was 40,000 g/g; and the polymerization activity (K) was 1,430 g/g·Hr·atm. Incidentally, this CE value was well consistent with the CE value obtained by measuring the Ti content of the polypropylene particles. In addition, no fine powder having a particle size of less than 75 μm was contained in the thus-obtained polypropylene particles, and the content of relatively small particles having a particle diameter of less than 180 μm was as low as 0.1% by weight.

On the other hand, the same procedure as defined in Example 1(3) was conducted to obtain an average CE of polypropylene particles existing in the first polymerization stage. As a result, it was found that the average CE of the polymer particles was 16,000 g/g. Incidentally, the average particle size of the polymer particles was 320 μm.

The operational conditions of the gas phase polymerization reactor 8 were adjusted such that a sum of partial pressures of ethylene and propylene was 12.6 kgf/cm$^2$ and the average residence time was 0.8 hours. Further, ethanol as an active hydrogen compound was fed in such an amount that the molar ratio of ethanol to aluminum contained in the polymer particles in the gas phase polymerization reactor 8 was 1.8.

When the polymer particles discharged from the gas phase polymerization reactor 8 was analyzed, it was found that the MFR was 29.4 g/10 min, the bulk density was 0.50 g/cc, the EPR content was 14.6% by weight, and the fish eye content was 140/250 cm$^2$.

(4) Evaluation of Physical Properties

As a result of the evaluation of physical properties of the block copolymer produced in Example 4(3), it was found that the flexural modulus was 14,500 kg/cm$^2$, the Izod impact strength was 10.7 kg·cm/cm and the facial impact strength was 115 kg·cm.

EXAMPLE 5

(1) Production of Propylene-Ethylene Block Copolymer

The continuous production of propylene-ethylene block copolymer was conducted in the same manner as defined in Example 2(3) except that ethanol was fed into the gas phase polymerization reactor 8 in such an amount that the molar ratio of ethanol to aluminum in triethyl aluminum supplied together with the polymer particles to the gas phase polymerization reactor was 0.8.

When the polymer particles discharged from the gas phase polymerization reactor 8 was analyzed, it was found that the MFR was 27.0 g/10 min, the bulk density was 0.45 g/cc, the EPR content was 15.2% by weight, and the fish eye content was 480/250 cm$^2$.

(2) Evaluation of Physical Properties

As a result of the evaluation of physical properties of the block copolymer produced in Example 5(1), it was found that the flexural modulus was 14,500 kg/cm$^2$, the Izod impact strength was 8.8 kg·cm/cm and the facial impact strength was 70 kg·cm.

COMPARATIVE EXAMPLE 5

(1) Production of Propylene-Ethylene Block Copolymer

The continuous production of propylene-ethylene block copolymer was conducted in the same manner as defined in Example 5 except that a classification system constituted by a cyclone was used instead of the classification system constituted by the liquid-power classifier and the thickener.

The polypropylene discharged from the bottom of the cyclone was retained in the polymerization reactor 1 for an average residence time of 2.0 hours. The average particle size ($D_p50$) of the polypropylene was 480 μm; the average CE was 57,000 g/g; and the polymerization activity (K) was 1,020 g/g·Hr·atm. Incidentally, this CE value was well consistent with the CE value obtained by measuring the Ti content of the polypropylene. In addition, the content of fine powder having a particle size of less than 75 μm in the polypropylene particles was 1.0% by weight, and the content of small particles having a particle diameter of less than 180 μm was 3.5% by weight.

On the other hand, the average CE of polypropylene particles existing in the first polymerization stage was obtained in the same manner as defined in Example 1(3). As a result, it was found that the average CE was 43,000 g/g. Incidentally, the average particle size of the polypropylene particles was 430 μm.

The operational conditions of the gas phase polymerization reactor 8 were so controlled that the polymerization temperature was 70° C.; a sum of partial pressures of ethylene and propylene was 12.2 kgf/cm$^2$; the molar fraction of propylene was 60 mol %; the hydrogen concentration was 1.7 mol %; and the average residence time in the gas polymerization reactor was 1.0 hour. Further, ethanol as an optional component was fed into the vessel in such an amount that the molar ratio of ethanol to aluminum contained in the polymer particles supplied to the gas phase polymerization reactor 8 was 1.2.

When the polymer particles discharged from the gas phase polymerization reactor 8 was analyzed, it was found that MFR was 31.6 g/10 min, the bulk density was 0.48 g/cc, the EPR content was 14.0% by weight, and the fish eye content was 420/250 cm$^2$.

(2) Evaluation of Physical Properties

As a result of the evaluation of physical properties of the block copolymer produced in Example 5(1), it was found that the flexural modulus was 14,900 kg/cm$^2$, the Izod impact strength was 7.2 kg·cm/cm and the facial impact strength was 55 kg·cm.

EXAMPLE 6

(1) Production of Solid Catalyst Component (A)

20 mol of Mg(OEt)$_2$ was charged into a 100-liter autoclave equipped with a jacket for heating and cooling, an agitator and a baffle. Successively, Ti(OBu)$_4$ was charged into the autoclave in such an amount that the molar ratio of Ti(OBu)$_4$ to magnesium in Mg(OEt)$_2$ charged was 0.60. The mixture was heated while agitating at 165 rpm.

The mixture was reacted at 140° C. for 3.0 hours and then cooled to 120° C. A toluene solution of MeSi(OPh)$_3$ was added to the mixture in such an amount that the molar ratio of MeSi(OPh)$_3$ to magnesium in Mg(OEt)$_2$ charged was 0.67. After the addition, the mixture was reacted at 130° C. for two hours. After completion of the reaction, the reaction mixture was cooled to 25° C., and Si(OEt)$_4$ was added to the reaction mixture in such an amount that the molar ratio of Si(OEt)$_4$ to magnesium in Mg(OEt)$_2$ charged was 0.05, thereby obtaining a slurry of the contact product (a*).

Next, the thus-obtained slurry was diluted with toluene to obtain a dilute slurry containing 0.555 mol of Mg per one liter of toluene. Thereafter, the dilute slurry was cooled to −10° C. while stirring at 200 rpm. Diethyl phthalate was added to the cooled slurry in such an amount that the molar ratio of diethyl phthalate to magnesium in Mg(OEt)$_2$ charged was 0.10. Successively, TiCl$_4$ was dropped into the slurry for 2 hours in such an amount that the molar ratio of TiCl$_4$ to magnesium in Mg(OEt)$_2$ charged was 4.0, thereby obtaining a homogeneous solution. At this time, there was observed no phenomenon that the slurry was changed into gel due to increase in viscosity thereof.

Subsequently, the same procedure as defined in Example 3(1) was conducted to obtain a toluene slurry of the solid catalyst component (A*) and then a slurry of the solid catalyst component (A). The thus-obtained solid catalyst component (A) contained 2.8 g of the propylene polymer per one gram of the component (A*).

(2) Measurement of Particle Size Distribution 2.7 millimol of triethyl aluminum and 0.05 millimol of t-butyl-ethyl-dimethoxysilane were charged into an induction stirring-type 2-liter autoclave at room temperature in the presence of a nitrogen stream. Next, after 750 g of liquid propylene was further charged into the autoclave, hydrogen was added thereto in such an amount that the hydrogen concentration in gas phase at 70° C. was 7.0 mol %.

While stirring, the mixture was heated to 70° C. at which 12.0 mg of the solid catalyst component (A*) produced in Example 6(1) was added to initiate the polymerization.

After the polymerization was conducted at 70° C. for one hour, an excess amount of propylene was purged to terminate the polymerization.

It was found that the yield of the thus-produced propylene polymer was 466 g, and that the propylene polymer had a polymerization activity (K) of 1,290 g/g·Hr·atm, a content of xylene-insoluble component (II$_{OXYL}$) of 99.2%, a bulk density ($\rho_B$) of 0.46 g/cc, and "n" of 8.7. Further, no fine powder having a particle size of less than 75 μm was produced.

(3) Production of Propylene-Ethylene Block Copolymer

Figure 3:
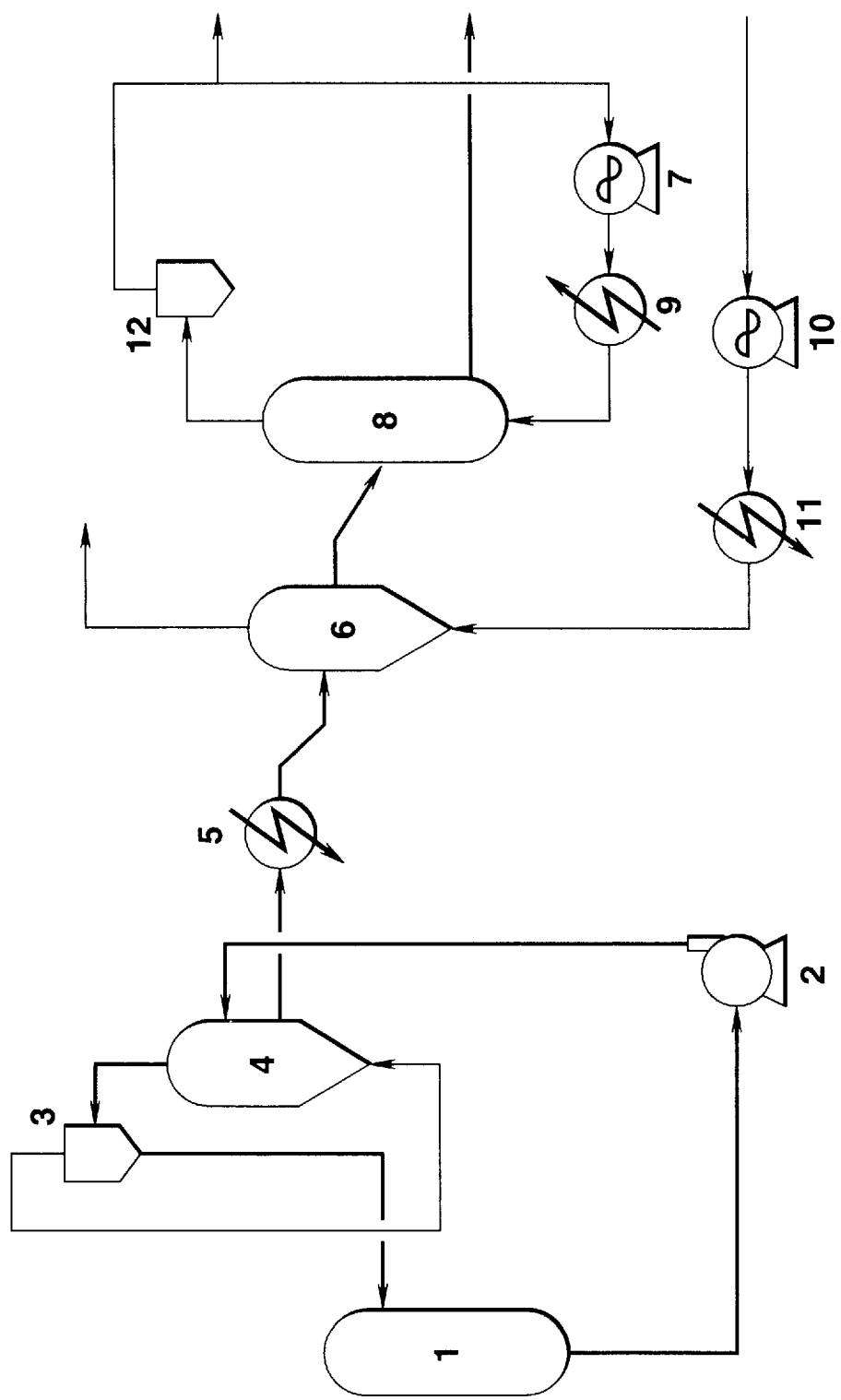
FIG. 3 is a flow diagram of a system for carrying out a process of Example 6.

The continuous production of propylene-ethylene block copolymer was conducted by using the process system as shown in FIG. 3.

The same procedure as defined in Example 3(3) was conducted except that the propylene polymerization reactor 1 was operated under such conditions that the solid catalyst component (A*) produced in Example 6(1) was fed at a feed rate of 0.66 g/Hr. Further, the supernatant liquid was fed from the thickener 3 (cyclone) to the bottom of the liquid-power classifier 4 at a linear velocity of 5.4 cm/sec.

The polypropylene discharged from a lower portion of the liquid-power classifier 4 was retained in the propylene polymerization reactor 1 for an average residence time of 2.0 hour. The average particle size (D$_p$50) was 490 μm; the average CE was 60,000 g/g; and the polymerization activity (K) was 1,100 g/g·Hr·atm. Incidentally, this CE value was well consistent with the CE value obtained by measuring the Ti content of the polypropylene particles. In addition, no fine powder having a particle size of less than 75 μm was contained in the polypropylene particles, and the content of small particles having a particle diameter of less than 180 μm was as low as 0.2% by weight.

On the other hand, the average CE of polypropylene particles existing in the first polymerization stage was obtained in the same manner as described in Example 2(3). The average CE of the polymer particles was 46,900 g/g. Incidentally, the average particle size of the polymer particles was 450 μm.

The operational conditions of the gas phase polymerization reactor 8 were adjusted such that the polymerization was maintained at 70° C.; a sum of partial pressures of ethylene and propylene was 12.2 kgf/cm$^2$; the molar fraction of propylene was 60 mol %; the hydrogen concentration was 1.7 mol %; and the average residence time was 1.0 hour. Further, ethanol as an active hydrogen compound was fed in such an amount that the molar ratio of ethanol to aluminum in triethyl aluminum supplied together with the polymer particles into the gas phase polymerization reactor 8 was 1.8.

When the polymer particles discharged from the gas phase polymerization reactor 8 was analyzed, it was found that the MFR was 35.64 g/10 min, the bulk density was 0.50 g/cc, the EPR content was 13.3% by weight, and the fish eye content was 115/250 cm$^2$.

(4) Evaluation of Physical Properties

As a result of the evaluation of physical properties of the block copolymer produced in Example 6(3), it was found that the flexural modulus was 15,800 kg/cm$^2$, the Izod impact strength was 8.6 kg·cm/cm and the facial impact strength was 80 kg·cm.

EXAMPLE 7

(1) Production of Solid Catalyst Component (A)

2.0 mol of Mg(OEt)$_2$ was charged into a 3-liter four-necked round flask equipped with a vacuum-stirrer and a thermometer. Successively, Ti(OBu)$_4$ was charged into the flask in such an amount that the molar ratio of Ti(OBu)$_4$ to magnesium in Mg(OEt)$_2$ charged was 0.6. The mixture was heated while agitating at 200 rpm.

The mixture was reacted at 135° C. for 3.0 hours and then cooled to 120° C. A toluene solution of MeSi(OPh)$_3$ was added to the mixture in such an amount that the molar ratio of MeSi(OPh)$_3$ to magnesium in Mg(OEt)$_2$ charged was 0.67. After the addition, the mixture was heated to 130° C. and reacted at that temperature for 3.0 hours. After completion of the reaction, the mixture was cooled to room temperature, and Si(OEt)$_4$ was added to the mixture in such an amount that the molar ratio of Si(OEt)$_4$ to magnesium in Mg(OEt)$_2$ charged was 0.05, to obtain a slurry of the contact product (a*).

The entire amount of the thus-obtained slurry was transported to an induction stirring-type 10-liter autoclave equipped with a cooling and heating jacket, and diluted with toluene to obtain a dilute slurry containing 0.515 mol of magnesium per one liter of toluene.

The dilute slurry was cooled to −10° C. while stirring at 300 rpm. Diethyl phthalate was added to the slurry in such an amount that the molar ratio of diethyl phthalate to magnesium in Mg(OEt)$_2$ charged was 0.1. Successively, TiCl$_4$ was dropped into the slurry for 1.0 hour in such an amount that the molar ratio of TiCl$_4$ to magnesium in Mg(OEt)$_2$ charged was 4.0, thereby obtaining a homogeneous solution. At this time, there was observed no phenomenon that the slurry was changed into gel due to increase in viscosity thereof.

The thus-obtained homogeneous solution was heated at a temperature rising rate of 0.5° C./min up to 15° C., and maintained at that temperature for one hour. Successively, the solution was heated at a temperature rising rate of 0.5° C./min up to 50° C. and maintained at that temperature for one hour. Further, the solution was heated at a temperature rising rate of 1.0° C./min up to 117° C. and retained at that temperature for one hour.

After completion of the treatment, the heating and the stirring were stopped to draw out a supernatant liquid. Thereafter, the residue was washed with toluene until reaching a residual liquid ratio of 1/50, thereby obtaining a solid slurry.

Next, after the amount of toluene in the thus-obtained solid slurry was so adjusted that the concentration of TiCl$_4$ was 2.0 mol per one liter of toluene. TiCl$_4$ was added to the solid slurry at room temperature in such an amount that the molar ratio of TiCl$_4$ to magnesium in Mg(OEt)$_2$ initially charged was 5.0. The solid slurry was heated while stirring at 300 rpm and reacted at 117° C. for one hour.

After completion of the reaction, the heating and the stirring were stopped to draw out a supernatant liquid. Thereafter, the residue was washed with toluene until reaching a residual liquid ratio of 1/150, thereby obtaining a toluene slurry of a solid catalyst component (A*).

The entire amount of the thus-obtained solid slurry was transported to a reactor equipped with Pfaudler 3-blade type impeller having an inner diameter of 660 mm and a length of cylindrical portion of 770 mm, and diluted with n-hexane to adjust the concentration of the solid catalyst component (A*) to 3 g/liter. While stirring the thus-obtained slurry at 300 rpm, triethyl aluminum was added thereto at 25° C. such that the ratio of triethyl aluminum to the solid catalyst component (A*) was 3.44 millimol/g. Further, t-butyl-ethyl-dimethoxysilane was added to the slurry such that the ratio of t-butyl-ethyl-dimethoxysilane to the solid catalyst component (A*) was 1.44 millimol/g. After the addition, the slurry was maintained at 25° C. for 30 minutes while continuously stirring.

Next, a propylene gas was fed to a liquid phase of the slurry at a constant rate for 72 minutes. After the feed of the propylene gas was stopped, the slurry was washed with n-hexane by a precipitation washing method until reaching a residual liquid ratio to 1/12, thereby obtaining a slurry of a solid catalyst component (A). The thus-obtained solid catalyst component (A) contained 2.7 g of propylene polymer per 1 g of the component (A*).

(2) Measurement of Average Particle Size 2.7 millimol of triethyl aluminum and 0.05 millimol of t-butyl-ethyl-dimethoxysilane were charged into an induction stirring-type 2-liter autoclave at room temperature in the presence of a nitrogen stream. Next, after 750 g of liquid propylene was further charged into the autoclave, hydrogen was added thereto in such an amount that the hydrogen concentration in a gas phase of the autoclave at 70° C. was 10.8 mol %.

While stirring, the mixture was heated to 70° C. at which 12 mg of the solid catalyst component (A*) produced in Example 7(1) was added to initiate the polymerization.

After the polymerization was conducted at 70° C. for one hour, an excess amount of propylene was purged to terminate the polymerization. The yield of propylene polymer was 444 g. The thus-obtained propylene polymer had an polymerization activity (K) of 1,230 g/g·Hr·atm, a CE of 37,000 g/g, an average particle size of 670 μm, a content of xylene-insoluble component (II$_{OXYL}$) of 99.0%, a bulk density ($\rho_B$) of 0.45 g/cc, and "n" of 6.5. Further, no fine powder having a particle size of less than 75 μm was produced. From the above results of the polymerization, it was found that the polymer having an average particle size of not less than 600 μm can be obtained where the CE was not less than 27,100 g/g. Incidentally, the polymerization activity (K) is defined as a yield (g) of the polymer per one hour, 1 atm of monomer and one gram of the component (A*).

(3) Production of Propylene-Ethylene Block Copolymer

The continuous production of propylene-ethylene block copolymer was carried out by using the process system of FIG. 2 of Example 1, in which the classification system constituted by the thickener 3 (liquid cyclone) and the precipitation liquid-power classifier 4, and the degassing system constituted by the double pipe-type heat exchanger 5 and the fluidized flash vessel 6 were incorporated between the liquid-phase polymerization reactor 1 having a capacity of 1.7 m$^3$ and equipped with a stirrer and the agitation-type gas phase polymerization reactor 8 having a capacity of 1.9 m$^3$.

Liquid propylene was supplied into the polymerization vessel 1 at a feed rate of 113.5 kg/hr, and hydrogen was supplied thereinto in such an amount that the concentration of hydrogen in the gas phase was 8.3 mol %. In addition, triethyl aluminum and t-butyl-ethyl-dimethoxysilane were also supplied into the polymerization reactor at feed rates of 30.1 g/hr and 1.3 g/hr, respectively. Further, the solid catalyst component (A*) produced in Example 7(1) was supplied into the vessel at a feed rate of 1.06 g/hr.

The polymerization temperature was adjusted to 70° C., the polymerization pressure to 33.3 kgf/cm$^2$ as a total pressure, the partial pressure of propylene to 27.9 kgf/cm$^2$, and the liquid amount in the polymerization reactor to 1 m$^3$.

The slurry polymerized in the polymerization reactor 1 had a concentration (solid content) of about 15% by weight. The slurry was fed into the thickener 3 at a volume flow rate of about 12 m$^3$/hr by means of a slurry pump 2. From the upper portion of the thickener 3, a supernatant liquid containing substantially no solid particles was discharged and fed to the bottom of the liquid-power classifier 4 at a linear velocity of 4.9 cm/sec. On the other hand, the high-concentration slurry discharged from the lower portion of the thickener 3 was supplied at a feed rate of about 10 m$^3$ to the upper portion of the liquid-power classifier 4, and contacted with the afore-mentioned supernatant liquid in a counter flow manner.

The slurry discharged from the upper portion of the liquid-power classifier 4 was circulated to the polymerization vessel 1 because of the inclusion of fine powder. On the other hand, the slurry containing a large amount of large particles was discharged from the lower portion of the liquid-power classifier 4. The concentration of the thus-discharged slurry was about 30% by weight. The drawing-out rate of the slurry was adjusted to 43 kg/hr when calculated in terms of polypropylene particles contained in the slurry.

The polypropylene discharged from the lower portion of the liquid-power classifier 4 was retained in the polymerization reactor 1 and the circulating line for an average residence time of 1.5 hours. The average particle size ($D_p50$) of the polypropylene was 690 μm; the average CE was 40,400 g/g; and the polymerization activity (K) was 960 g/g·Hr·atm. Incidentally, this CE value was well consistent with the CE value obtained by measuring the Ti content of the polypropylene particles. In addition, no fine powder having a particle size of less than 75 μm was contained in the thus-obtained polypropylene particles.

On the other hand, in order to obtain an average CE of the polypropylene particles existing in the first polymerization stage, the slurry was sampled from the suction line of the slurry pump 2. The sampled slurry was purged to remove propylene therefrom, thereby obtaining polypropylene powder. From the Ti content in the thus-obtained particles, it was found that the average CE of the polymer was 22,000 g/g. Incidentally, the average particle size of the polymer particles was 560 μm.

The solid polypropylene particles obtained in the fluidized flash vessel 6 were transported to the gas phase polymerization reactor 8 to copolymerize propylene with ethylene.

In the gas phase polymerization vessel 8 on which agitating blades were supplementarily provided to enhance mixing effects, a gaseous mixture composed of ethylene, propylene, hydrogen and nitrogen was circulated by means of the gas blower 7. In this case, ethylene and propylene were supplied in such an amount that a sum of partial pressures of ethylene and propylene was 14.0 kgf/cm$^2$ and the molar fraction of propylene was maintained at a constant value of 75 mol %, while hydrogen was supplied in such an amount that the hydrogen concentration was maintained at 1.0 mol %. Further, ethanol as an active hydrogen compound was supplied in such an amount that the molar ratio of ethanol to aluminum in triethyl aluminum supplied to the gas phase polymerization reactor together with the polymer particles was 1.2. Incidentally, the polymerization temperature and the average residence time in the vapor polymerization reactor 8 was adjusted to 70° C. and 1.0 hour, respectively.

When the polymer particles discharged from the gas phase polymerization reactor 8 was analyzed, it was found that the MFR was 36.2 g/10 min, the bulk density was 0.47 g/cc, the EPR content was 18.3% by weight, the CHS was 1.1% by weight and the fish eye content was 195/250 cm$^2$.

(4) Evaluation of Physical Properties

As a result of the evaluation of physical properties of the block copolymer produced in Example 7(3), it was found that the flexural modulus was 12,400 kg/cm$^2$, and the Izod impact strength was 12.1 kg·cm/cm.

EXAMPLE 8

(1) Production of Propylene-Ethylene Block Copolymer

The continuous production of propylene-ethylene block copolymer was carried out by using the process system defined in Example 7(3).

Liquid propylene was supplied into the polymerization vessel 1 at a feed rate of 113.1 kg/hr, and hydrogen was supplied thereinto in such an amount that the concentration of hydrogen in the gas phase was 7.5 mol %. In addition, triethyl aluminum and t-butyl-ethyl-dimethoxysilane were also supplied into the polymerization reactor at feed rates of 30.7 g/hr and 1.4 g/hr, respectively. Further, the solid catalyst component (A*) produced in Example 7(1) was supplied into the vessel at a feed rate of 1.02 g/hr.

The polymerization temperature was adjusted to 70° C., the polymerization pressure to 32.9 kgf/cm$^2$ as a total pressure, the partial pressure of propylene to 28.5 kgf/cm$^2$, and the liquid amount in the polymerization reactor to 1 m$^3$.

The slurry polymerized in the polymerization reactor 1 had a concentration (solid content) of about 10% by weight. The slurry was fed into the thickener 3 at a volume flow rate of about 12 m$^3$/hr by means of a slurry pump 2. From the upper portion of the thickener 3, a supernatant liquid containing substantially no solid particles was discharged and fed to the bottom of the liquid-power classifier 4 at a linear velocity of 5.3 cm/sec. On the other hand, the high-concentration slurry discharged from the lower portion of the thickener 3 was supplied at a feed rate of about 10 m$^3$ to the upper portion of the liquid-power classifier 4 as it was, and contacted with the afore-mentioned supernatant liquid in a counter flow manner.

The slurry discharged from the upper portion of the liquid-power classifier 4 was circulated to the polymerization vessel 1 because of the inclusion of fine powder. On the other hand, the slurry containing a large amount of large particles was discharged from the lower portion of the liquid-power classifier 4. The concentration of the thus-discharged slurry was about 36% by weight. The drawing-out rate of the slurry was adjusted to 43 kg/hr when calculated in terms of polypropylene particles contained in the slurry.

The polypropylene discharged from the lower portion of the liquid-power classifier 4 was retained in the polymerization reactor 1 and the circulating line for an average residence time of 1.0 hours. The average particle size ($D_p50$) of the polypropylene was 665 μm; the average CE was 36,400 g/g; and the polymerization activity (K) was 1,280 g/g·Hr·atm. Incidentally, this CE value was well consistent with the CE value obtained by measuring the Ti content of the polypropylene particles. In addition, no fine powder having a particle size of less than 75 μm was contained in the thus-obtained polypropylene particles.

On the other hand, in order to obtain an average CE of the polypropylene particles existing in the first polymerization stage, the slurry was sampled from the suction line of the slurry pump 2. The sampled slurry was purged to remove propylene therefrom, thereby obtaining polypropylene powder. From the Ti content in the thus-obtained particles, it was found that the average CE of the polymer was 16,500 g/g. Incidentally, the average particle size of the polymer particles was 505 μm.

The solid polypropylene particles obtained in the fluidized flash vessel 6 were transported to the gas phase polymerization reactor 8 to copolymerize propylene with ethylene.

In the gas phase polymerization vessel 8 on which agitating blades were supplementarily provided to enhance mixing effects, a gaseous mixture composed of ethylene, propylene, hydrogen and nitrogen was circulated by means of the gas blower 7. In this case, ethylene and propylene were supplied in such an amount that a sum of partial pressures of ethylene and propylene was 14.4 kgf/cm$^2$ and the molar fraction of propylene was maintained at a constant value of 72.5 mol %, while hydrogen was supplied in such an amount that the hydrogen concentration was maintained at 1.3 mol %. Further, ethanol as an active hydrogen compound was supplied in such an amount that the molar ratio of ethanol to aluminum in triethyl aluminum supplied to the gas phase polymerization reactor together with the polymer particles was 1.2. Incidentally, the polymerization temperature and the average residence time in the gas phase polymerization reactor 8 was adjusted to 70° C. and 0.9 hour, respectively.

When the polymer particles discharged from the gas phase polymerization reactor 8 was analyzed, it was found that the MFR was 29.0 g/10 min, the bulk density was 0.45 g/cc, the EPR content was 22.3% by weight, the CHS was 1.3% by weight and the fish eye content was 35/250 cm$^2$.

COMPARATIVE EXAMPLE 6

(1) Production of Solid Catalyst Component (A)

A slurry of the contact product (a*) was produced in the same manner as defined in Example 7(1). Next, the solid catalyst component (A) was produced in the same manner as defined in Example 7(1) except that the content of Mg was adjusted to 0.545 mol per one liter of toluene.

(2) Measurement of Average Particle Size

The same procedure as defined in Example 1(2) was conducted except that the solid catalyst component (A*) produced in Comparative Example 6(1) was used. As a result, 435 g of propylene polymer was produced. The propylene polymer produced had an polymerization activity (K) of 1,210 g/g·Hr·atm, a CE of 36,300 g/g, an average particle size of 370 μm, a content of xylene insoluble component (II$_{OXYL}$) of 98.8%, a bilk density ($\rho_B$) of 0.48 g/cc, and "n" of 8.1. Further, no fine powder was produced.

(3) Production of Propylene-Ethylene Block Copolymer

The production of propylene-ethylene block copolymer was conducted in the same manner as defined in Example 7(3) except that the solid catalyst component produced in Comparative Example 6(1) was used.

The polypropylene discharged from the lower portion of the liquid-power classifier 4 had an average particle size (D$_p$50) of 380 μm, an average CE of 40,100 g/g and a polymerization activity (K) of 960 g/g·Hr·atm. Incidentally, this CE value was well consistent with the CE value obtained by measuring the Ti content of the polypropylene particles. In addition, no fine powder having a particle size of less than 75 μm was contained in the thus-obtained polypropylene particles.

When the polymer particles discharged from the gas phase polymerization reactor 8 was analyzed, it was found that the MFR was 46.0 g/10 min; the bulk density was 0.49 g/cc; the EPR content was 10.3% by weight; and the CHS was 0.9% by weight. The polymerization activity of EPR was low.

COMPARATIVE EXAMPLE 7

(1) Production of Propylene-Ethylene Copolymer

The continuous production of propylene-ethylene block copolymer was conducted in the same manner as defined in Example 7(3) except for using a process system shown in FIG. 4 of Comparative Example 1, which removed the classification system constituted by the thickener 3 and the precipitation liquid-power classifier 4 from that shown in FIG. 1.

Since the classification system was removed from the process, the average CE of the propylene polymer existing in the first polymerization stage became identical to that of the propylene polymer transported to the second polymerization stage. Further, it was found that the polymer product contained 1.0% by weight of fine powder having a particle size of less than 75 μm, and 3.6% by weight of small particles having a particle size of less than 180 μm.

When the polymer particles discharged from the gas phase polymerization reactor 8 was analyzed, it was found that the MFR was 31.0 g/10 min, the bulk density was 0.43 g/cc, and the EPR content was 18.8% by weight. Incidentally, the fish eye content was not less than 10,000/250 cm$^2$, so that the accurate evaluation thereof was impossible.

(2) Evaluation of Physical Properties

As a result of the evaluation of the block copolymer obtained in Comparative Example 7(1), it was found that the flexural modulus was 11.600 kg/cm$^2$ and the Izod impact strength was 10.6 kg·cm/cm.

COMPARATIVE EXAMPLE 8

(1) Production of Solid Catalyst Component (A)

The production of the solid catalyst component was conducted in the same manner as defined in Example 7(1) except that the temperature was elevated from -10° C. to 117° C. at a temperature rising rate of 2.5° C./min.

(2) Measurement of Particle Size Distribution

The same procedure as defined in Example 7(2) was conducted except that the solid catalyst component produced in Comparative Example 8(1) was used. As a result, 420 g of propylene polymer was produced. The propylene polymer produced had a polymerization activity (K) of 1,1700 g/g·Hr atm, a content of xylene-insoluble component (II$_{OXYL}$) of 98.7%, a bulk density ($\rho_B$) of 0.45 g/cc, and "n" of 3.9. The content of the fine powder having a particle size of less than 75 μm was 0.2% by weight.

(3) Production of Propylene-Ethylene Block Copolymer

The same procedure as defined in Example 7(3) was conducted except that the solid catalyst component produced in Comparative Example 8(1) was used.

When the polymer particles discharged from the gas phase polymerization reactor 8 was analyzed, it was found that the MFR was 33.9 g/10 min; the bulk density was 0.45 g/cc; the EPR content was 18.0% by weight; and the fish eye content was 780/250 cm$^2$.

Incidentally, the small particles having a particle size of less than 250 μm were accumulated in the propylene polymerization reactor 1 in the first polymerization stage with elapsed time, which made the continuous operation impossible.

(4) Evaluation of Physical Properties

The block copolymer produced in Comparative Example 8(3) was evaluated for various properties. As a result, it has been found that the flexural modulus was 12,500 kg/cm$^2$ and the Izod impact strength was 11.2 kg·cm/cm.

EXAMPLE 9

(1) Production of Solid Catalyst Component (A)

2.0 mol of Mg(OEt)$_2$ was charged into a 3-liter four-necked round flask equipped with a vacuum-stirrer and a thermometer. Successively, Ti(OBu)$_4$ was charged into the flask in such an amount that the molar ratio of Ti(OBu)$_4$ to magnesium in Mg(OEt)$_2$ charged was 0.6. The mixture was heated while agitating at 200 rpm.

The mixture was reacted at 135° C. for 3.0 hours and then cooled to 120° C. A toluene solution of MeSi(OPh)$_3$ was added to the mixture in such an amount that the molar ratio of MeSi(OPh)$_3$ to magnesium in Mg(OEt)$_2$ charged was 0.67. After the addition, the mixture was heated to 130° C. and reacted at that temperature for 3.0 hours. After completion of the reaction, the mixture was cooled to room temperature, and Si(OEt)$_4$ was then added to the mixture in such an amount that the molar ratio of Si(OEt)$_4$ to magnesium in Mg(OEt)$_2$ charged was 0.05, thereby obtaining a slurry of the contact product (a*).

The entire amount of the thus-obtained slurry was transported to an induction stirring-type 10-liter autoclave equipped with a cooling and heating jacket, and diluted with toluene to obtain a dilute slurry containing 0.485 mol of magnesium per one liter of toluene.

The dilute slurry was cooled to −10° C. while stirring at 300 rpm. Diethyl phthalate was added to the slurry in such an amount that the molar ratio of diethyl phthalate to magnesium in Mg(OEt)$_2$ charged was 0.1. Successively, TiCl$_4$ was dropped into the slurry for 1.0 hour in such an amount that the molar ratio of TiCl$_4$ to magnesium in Mg(OEt)$_2$ charged was 4.0, thereby obtaining a homogeneous solution. At this time, there was observed no phenomenon that the slurry was changed into gel due to increase in viscosity thereof.

The thus-obtained homogeneous solution was heated at a temperature rising rate of 0.5° C./min up to 15° C., and maintained at that temperature for one hour. Successively, the solution was heated at a temperature rising rate of 0.5° C./min up to 50° C. and maintained at that temperature for one hour. Further, the solution was heated at a temperature rising rate of 1.0° C./min up to 117° C. and retained at that temperature for one hour.

After completion of the treatment, the heating and the stirring were stopped to draw out a supernatant liquid. Thereafter, the residue was washed with toluene until reaching a residual liquid ratio of 1/50, thereby obtaining a solid slurry.

Next, after the amount of toluene in the thus-obtained solid slurry was so adjusted that the concentration of TiCl$_4$ was 2.0 mol per one liter of toluene. TiCl$_4$ was added to the solid slurry at room temperature in such an amount that the molar ratio of TiCl$_4$ to magnesium in Mg(OEt)$_2$ initially charged was 5.0. The solid slurry was heated while stirring at 300 rpm and reacted at 117° C. for one hour.

After completion of the reaction, the heating and the stirring were stopped to draw out a supernatant liquid. Thereafter, the residue was washed with toluene until reaching a residual liquid ratio of 1/150, thereby obtaining a toluene slurry of a solid catalyst component (A*).

The entire amount of the thus-obtained solid slurry was transported to a reactor equipped with Pfaudler 3-blade type impeller having an inner diameter of 660 mm and a length of cylindrical portion of 770 mm, and diluted with n-hexane to adjust the concentration of the solid catalyst component (A*) to 3 g/liter. While stirring the thus-obtained slurry at 300 rpm, triethyl aluminum was added thereto at 25° C. such that the ratio of triethyl aluminum to the solid catalyst component (A*) was 3.44 millimol/g. Further, t-butyl-ethyl-dimethoxysilane was added to the slurry such that the ratio of t-butyl-ethyl-dimethoxysilane to the solid catalyst component (A*) was 1.44 millimol/g. After the addition, the slurry was maintained at 25° C. for 30 minutes while continuously stirring.

Next, a propylene gas was fed into a liquid phase of the slurry at a constant rate (for example, 10 g propylene per minute) for 72 minutes. After the feed of the propylene gas was stopped, the slurry was washed with n-hexane by a precipitation washing method until reaching a residual liquid ratio to 1/12, thereby obtaining a slurry of a solid catalyst component (A). The thus-obtained solid catalyst component (A) contained 2.5 g of propylene polymer per 1 g of the component (A*).

(2) Measurement of Average Particle Size 2.7 millimol of triethyl aluminum and 0.05 millimol of t-butyl-ethyl-dimethoxysilane were charged into an induction stirring-type 2-liter autoclave at room temperature in the presence of a nitrogen stream. Next, after 750 g of liquid propylene was further charged into the autoclave, hydrogen was also added thereto in such an amount that the hydrogen concentration in a gas phase of the autoclave at 70° C. was 10.8 mol %.

While stirring, the mixture was heated to 70° C. at which 12 mg of the solid catalyst component (A*) produced in Example 9(1) was added to initiate the polymerization.

After the polymerization was conducted at 70° C. for one hour, an excess amount of propylene was purged to terminate the polymerization. The yield of propylene polymer was 390 g. The thus-obtained propylene polymer had an polymerization activity (K) of 1,080 g/g·Hr·atm, a CE of 32,500 g/g, an average particle size of 835 μm, a content of xylene-insoluble component (II$_{OXYL}$) of 99.0%, a bulk density ($_{\rho B}$) of 0.45 g/cc, and "n" of 7.5. Further, no fine powder having a particle size of less than 75 μm was produced. From the above results of the polymerization, it was found that the polymer particles having an average particle size of not less than 600 μm can be obtained where the CE was not less than 12,600 g/g.

(3) Production of Propylene-Ethylene Block Copolymer

The continuous production of propylene-ethylene block copolymer was carried out by using the process system of FIG. 2 of Example 1. Incidentally, the propylene polymerization reactor 1 had a capacity of 0.9 m$^3$.

Liquid propylene was supplied into the polymerization vessel 1 at a feed rate of 97.9 kg/hr, and hydrogen was supplied thereinto in such an amount that the concentration of hydrogen in the gas phase was 8.9 mol %. In addition, triethyl aluminum and t-butyl-ethyl-dimethoxysilane were also supplied into the polymerization reactor at feed rates of 28.1 g/hr and 1.3 g/hr, respectively. Further, the solid catalyst component (A*) produced in Example 9(1) was supplied into the vessel at a feed rate of 1.50 g/hr.

The polymerization temperature was adjusted to 70° C., the polymerization pressure to 32.2 kgf/cm$^2$ as a total pressure, the partial pressure of propylene to 28.4 kgf/cm$^2$, and the liquid amount in the polymerization reactor to 0.5 m$^3$.

The slurry polymerized in the polymerization reactor 1 had a concentration (solid content) of about 16% by weight. The slurry was fed into the thickener 3 at a volume flow rate of about 12 m$^3$/hr by means of a slurry pump 2. From the upper portion of the thickener 3, a supernatant liquid containing substantially no solid particles was discharged and fed to the bottom of the liquid-power classifier 4 at a linear velocity of 4.0 cm/sec. On the other hand, the high-concentration slurry discharged from the lower portion of the thickener 3 was supplied at a feed rate of about 10 m$^3$/hr to the upper portion of the liquid-power classifier 4 as it was, and contacted with the afore-mentioned supernatant liquid in a counter flow manner.

The slurry discharged from the upper portion of the liquid-power classifier 4 was circulated to the polymerization vessel 1 because of the inclusion of fine powder. On the other hand, the slurry containing a large amount of large particles was discharged from the lower portion of the liquid-power classifier 4. The concentration of the thus-discharged slurry was about 32% by weight. The drawing-out rate of the slurry was adjusted to 37 kg/hr when calculated in terms of polypropylene particles contained in the slurry.

The polypropylene discharged from the lower portion of the liquid-power classifier 4 was retained in the polymerization reactor 1 and the circulating line for an average residence time of 1.0 hours. The average particle size $(D_p 50)$ of the polypropylene was 730 μm; the average CE was 22,000 g/g; and the polymerization activity (K) was 770 g/g·Hr·atm. Incidentally, this CE value was well consistent with the CE value obtained by measuring the Ti content of the polypropylene particles. In addition, no fine powder having a particle size of less than 75 μm was contained in the thus-obtained polypropylene particles.

On the other hand, in order to obtain an average CE of the polypropylene particles existing in the first polymerization stage, the slurry was sampled from the suction line of the slurry pump 2. The sampled slurry was purged to remove propylene therefrom, thereby obtaining polypropylene powder. From the Ti content in the thus-obtained particles, it was found that the average CE of the polymer was 13,800 g/g. Incidentally, the average particle size of the polymer particles was 620 μm.

The solid polypropylene particles obtained in the fluidized flash vessel 6 were transported to the gas phase polymerization reactor 8 to copolymerize propylene with ethylene.

In the gas phase polymerization vessel 8 in which agitating blades were supplementarily provided to enhance mixing effects, a gaseous mixture composed of ethylene, propylene, hydrogen and nitrogen was circulated by means of the gas blower 7. In this case, ethylene and propylene were supplied at such a feed rate that a sum of partial pressures of ethylene and propylene was 12.7 kgf/cm$^2$ and the molar fraction of propylene was maintained at a constant value of 70 mol %, while hydrogen was supplied in such an amount that the hydrogen concentration was maintained at 1.3 mol %. Further, ethanol as an active hydrogen compound was supplied in such an amount that the molar ratio of ethanol to aluminum in triethyl aluminum supplied to the gas phase polymerization reactor together with the polymer particles was 1.2. Incidentally, the polymerization temperature and the average residence time in the gas phase polymerization reactor 8 was adjusted to 70° C. and 1.0 hour, respectively.

When the polymer particles discharged from the gas phase polymerization reactor 8 was analyzed, it was found that the MFR was 13.2 g/10 min, the bulk density was 0.40 g/cc, the EPR content was 26.2% by weight, the CHS was 1.3% by weight and the fish eye content was 310/250 cm$^2$.

(4) Evaluation of Physical Properties

As a result of the evaluation of physical properties of the block copolymer produced in Example 9(3), it was found that the flexural modulus was 8,860 kg/cm$^2$, and the Izod impact strength was 65.8 kg·cm/cm.

The polymerization conditions used in Examples and Comparative Examples and properties of polymer particles and block copolymers are shown in Table 3.

TABLE 3

| | Polymerization conditions | | | | Results | |
|---|---|---|---|---|---|---|
| Example No. | "n" | APS[1] (μm) | Classification (CE ratio[2]) | EtOH/Al (m.r.) | [EPR] (wt %) | $\rho_B$ (g/cc) |
| Example 1 | 11.2 | 515 | used(1.47) | 0.0 | 15.0 | 0.36 |
| Example 2 | 11.2 | 495 | used(1.33) | 2.0 | 14.4 | 0.50 |
| Example 3 | 8.6 | 450 | used(1.40) | 1.8 | 14.4 | 0.46 |
| Example 4 | 10.2 | 445 | used(2.50) | 1.8 | 14.6 | 0.50 |
| Example 5 | 11.2 | 495 | used(1.33) | 0.8 | 15.2 | 0.45 |
| Example 6 | 8.7 | 490 | used(1.28) | 1.8 | 13.3 | 0.50 |
| Example 7 | 6.5 | 690 | used(1.84) | 1.2 | 18.3 | 0.47 |
| Example 8 | 6.5 | 665 | used(2.21) | 1.2 | 22.3 | 0.45 |
| Example 9 | 7.5 | 730 | used(1.59) | 1.2 | 26.2 | 0.40 |
| Comparative Example 1 | 11.2 | — | not used (1.00) | 0.0 | 15.0 | 0.37 |
| Comparative Example 2 | 3.9 | — | used | 0.0 | 15.0 | 0.37 |
| Comparative Example 3 | 11.2 | — | not used (1.00) | 2.0 | 14.9 | 0.47 |
| Comparative Example 4 | 3.9 | — | used | 2.0 | 15.0 | 0.47 |
| Comparative Example 5 | 8.7 | — | used(1.47)[3] | 1.2 | 14.0 | 0.48 |
| Comparative Example 6 | 8.1 | 380 | used | 1.2 | 10.3 | 0.49 |
| Comparative Example 7 | 8.1 | — | not used (1.00) | 1.2 | 18.8 | 0.43 |
| Comparative Example 8 | 3.9 | — | used | 1.2 | 18.0 | 0.45 |

| | Results | | | | |
|---|---|---|---|---|---|
| Example No. | CHS (wt %) | gel (/250 cm$^2$) | FM (Kg/cm$^2$) | Izod (Kg·cm/cm) | FIS[4] (Kg/cm) | Accumulation[5] |
| Example 1 | — | 1592 | 14800 | 8.0 | 65 | not occurred |
| Example 2 | — | 249 | 14900 | 9.7 | 95 | not occurred |
| Example 3 | — | 139 | 15400 | 9.7 | 95 | not occurred |
| Example 4 | — | 140 | 14500 | 10.7 | 115 | not occurred |
| Example 5 | — | 480 | 14500 | 8.8 | 70 | not occurred |
| Example 6 | — | 115 | 15800 | 8.6 | 80 | not occurred |
| Example 7 | 1.1 | 195 | 12400 | 12.1 | — | not occurred |
| Example 8 | 1.3 | 35 | — | — | — | not occurred |
| Example 9 | 1.3 | 310 | 8860 | 65.8 | — | not occurred |
| Comparative Example 1 | — | ≥10000 | 14200 | 6.2 | 30 | not occurred |
| Comparative Example 2 | — | 4410 | 14700 | 6.5 | 35 | occurred |
| Comparative Example 3 | — | ≥10000 | 14000 | 6.1 | 30 | not occurred |
| Comparative Example 4 | — | 430 | 14700 | 7.8 | 80 | occurred |
| Comparative Example 5 | — | 420 | 14900 | 7.2 | 55 | not occurred |
| Comparative Example 6 | 0.9 | — | — | — | — | not occurred |

TABLE 3-continued

| | | | | | |
|---|---|---|---|---|---|
| Comparative Example 7 | — | ≧10000 | 11600 | 10.6 | — | not occurred |
| Comparative Example 8 | — | 780 | 12500 | 11.2 | — | occurred |

Note:
*1)APS: Average particle size supplied to the second stage.
*2)CE ratio: the ratio of the CE of PP particles in the first reactor and the CE of PP particles supplied to the second stage.
*3)In Comparative Example 5, cyclone is used as a classifier.
*4)FIS: Facial impact strength.
*5)Small particle accumulation in the first reactor.

What is claimed is:

1. A process for continuously producing a propylene-based block copolymer, which process comprises:

a first polymerization step comprising polymerizing α-olefin comprising propylene in the presence of hydrogen and a stereoregular polymerization catalyst comprising a solid catalyst component containing magnesium, titanium, a halogen atom and an electron-donor compound, an organoaluminum compound and, if required, an electron-donor compound in a single polymerization reactor;

a step of separating the polymer existing in the first polymerization step into a polymer (1) having an average catalytic efficiency, CE, which is not less than 1.1 times that of the polymer existing in the first polymerization step, and a polymer (2) having an average catalytic efficiency, CE, which is less than 1.1 times that of the polymer existing in the first polymerization step, said polymer (1) being supplied to a second polymerization step;

a second polymerization step comprising transporting α-olefin polymer obtained in the first polymerization step to a copolymerization reactor and copolymerizing propylene with an α-olefin other than propylene in a gas phase substantially in the presence of said stereoregular polymerization catalyst used in the first polymerization step;

an index n which represents the sharpness of a particle size distribution of said solid catalyst component being not less than 5 when a particle size distribution thereof is approximated to the Rosin-Rammler distribution; and an average catalytic efficiency, CE, of polymer discharged from the first polymerization step and supplied to the second polymerization step being not less than 1.1 times an average catalytic efficiency, CE, of the polymer existing in the first polymerization step.

2. A process according to claim 1, wherein said polymer discharged from the polymerization reactor in the first polymerization step is separated into a first polymer having an average catalytic efficiency, CE, which is not less than 1.1 times that of the polymer existing in the first polymerization step, and a second polymer having an average catalytic efficiency, CE, which is less than 1.1 times that of the polymer existing in the first polymerization step, said first polymer being supplied to the second polymerization step, and said second polymer being circulated to the first polymerization step.

3. A process according to claim 1, wherein said polymer discharged from the first polymerization step and supplied to the second polymerization step has an average catalytic efficiency, CE, of not less than 20,000 g/g.

4. A process according to claim 1, wherein said polymer discharged from the first polymerization step and supplied to the second polymerization step has an average particle size of not less than 600 μm.

5. A process according to claim 1, wherein the copolymerization of propylene with α-olefin other than propylene in the second polymerization step is carried out in the presence of an active hydrogen compound.

6. A process according to claim 5, wherein the molar ratio of said active hydrogen compound to aluminum in the organoaluminum compound supplied to the second polymerization step is more than 1.0.

7. A process according to claim 1, wherein the polymerization of the α-olefin comprising propylene in the first polymerization step is carried out by a bulk polymerization process using liquid propylene as a reaction medium.

8. A process according to claims 1, wherein the polymerization is carried out by a bulk polymerization process using a reaction medium comprising liquid propylene.

9. A process according to claim 1, wherein said solid catalyst component containing magnesium, titanium, halogen atom and an electron-donor compound is contacted with the organoaluminum compound and the α-olefin in the presence of an organosilicon compound represented by the formula (I) to conduct a preliminary polymerization treatment:

$$(R^7)(R^8)_n Si(OR^9)_{3-n} \qquad (I)$$

wherein $R^7$ is a branched or cyclic alkyl group having 3 to 12 carbon atoms; $R^8$ is an alkyl group having 1 to 10 carbon atoms, an aralkyl group having 7 to 12 carbon atoms or an aryl group having 6 to 12 carbon atoms; $R^9$ is an methyl or ethyl group; and n is 1 or 2, and the organoaluminum compound and, if required, an electron-donar compound is contacted therewith, thereby producing said stereoregular polymerization catalyst.

10. A process according to claim 1, wherein the ratio between said solid catalyst component, an organoaluminum compound and said organosilicon compound, which are contacted with each other upon the preliminary polymerization treatment, is defined by the following formulae:

aluminum in organoaluminum compound/
solid catalyst component ≧ 0.1 (mol/kg), and
silicon in organosilicone compound/
solid catalyst component ≧ 0.2 (mol/kg).

11. A process according to claim 1, wherein the slurry of the polymer discharged from the polymerization reactor used in the first polymerization step is supplied to a thickener to obtain a high-concentration slurry and a low-concentration slurry, and said high-concentration slurry is supplied to the sedimentation liquid-power classifier and contacted with said low-concentration slurry used as a counter flow liquid in a counter flow manner to be classified into a first slurry containing a large amount of large particles which is supplied to the second polymerization step, and a second slurry containing a large amount of small particles which is circulated to the first polymerization step.

12. A process according to claim 11, wherein the concentration of the particle in the slurries separated by the thickener are more than 0% by weight and not more than 70% by weight.

13. A process according to claim 1, which further comprises the step of classifying a slurry of the polymer discharged from a polymerization reactor used in the first polymerization step into a first slurry containing a large amount of large particles and a second slurry containing a large amount of small particles comprising a classification system using a sedimentation liquid-power classifier, said first slurry being transported to the second polymerization step and said second slurry being circulated to the first polymerization step.

14. A process for continuously producing a propylene-based block copolymer, which process comprises:

a first polymerization step comprising polymerizing α-olefin comprising propylene in the presence of hydrogen and a stereoregular polymerization catalyst comprising a solid catalyst component containing magnesium, titanium, halogen atom and an electron-donor compound, an organoaluminum compound and, if required, an electron-donor compound in a single polymerization reactor; and a second polymerization step comprising transporting α-olefin polymer obtained in the first polymerization step to a copolymerization reactor and copolymerizing propylene with α-olefin other than propylene in a gas phase substantially in the presence of said stereoregular polymerization catalyst used in the first polymerization step, an index n which represents the sharpness of a particle size distribution of said solid catalyst component being not less than 5 when a particle size distribution thereof is approximated to Rosin-Rammler distribution, and a slurry of the polymer discharged from a polymerization reactor used in the first polymerization step being classified into a first slurry containing a large amount of large particles and a second slurry containing a large amount of small particles using a classification system comprising a sedimentation liquid-power classifier, said first slurry being transported to the second polymerization step, and said second slurry being circulated to the first polymerization step.

15. A process according to claim 14, wherein the slurry of said polymer discharged from the polymerization reactor used in the first polymerization step is supplied to the sedimentation liquid-power classifier and contacted with a counter flow liquid comprising liquid propylene in a counter flow manner, to classify into a first slurry containing a large amount of large particles and a second slurry containing a large amount of small particles, said second slurry being supplied to a thickener and separated into a high-concentration slurry which is circulated to the polymerization reactor in the first polymerization step, and a low-concentration slurry which is used as said counter flow liquid in the liquid-power classifier.

16. A process according to claim 15, wherein the concentration of the particle in the slurries separated by the thickener are more than 0% by weight and not more than 70% by weight.

* * * * *